United States Patent
Numata et al.

(10) Patent No.: US 11,237,422 B2
(45) Date of Patent: Feb. 1, 2022

(54) DISPLAY DEVICE

(71) Applicant: Japan Display Inc., Minato-ku (JP)

(72) Inventors: Yudai Numata, Tokyo (JP); Kentaro Okuyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 17/071,079

(22) Filed: Oct. 15, 2020

(65) Prior Publication Data
US 2021/0026171 A1 Jan. 28, 2021

Related U.S. Application Data

(63) Continuation of application No. 16/053,860, filed on Aug. 3, 2018, now Pat. No. 10,845,637.

(30) Foreign Application Priority Data

Aug. 7, 2017 (JP) .............................. JP2017-152648

(51) Int. Cl.
*G02F 1/1334* (2006.01)
*G02F 1/1335* (2006.01)
(Continued)

(52) U.S. Cl.
CPC ......... *G02F 1/1334* (2013.01); *G02B 6/0028* (2013.01); *G02B 6/0055* (2013.01);
(Continued)

(58) Field of Classification Search
CPC ............... G02F 1/1334; G02F 1/13306; G02F 1/133502; G02F 1/1343; G02F 1/13316;
(Continued)

(56) References Cited

U.S. PATENT DOCUMENTS

2002/0003593 A1 1/2002 Arakawa
2003/0081161 A1 5/2003 Ozawa
(Continued)

FOREIGN PATENT DOCUMENTS

JP 62-109003 A 5/1987
JP 5-88174 A 4/1993
(Continued)

OTHER PUBLICATIONS

Notice of Reasons for Refusal dated Jun. 29, 2021 in Japanese Patent Application No. 2017-152648 (submitting English machine translation only), 6 pages.

*Primary Examiner* — Charles S Chang
(74) *Attorney, Agent, or Firm* — Oblon, McClelland, Maier & Neustadt, L.L.P.

(57) ABSTRACT

According to one embodiment, a display device includes a display panel, a light emitting element, a light guide layer and a first optical layer. The display panel includes a first substrate, a second substrate opposed to the first substrate, and a polymer dispersed liquid crystal layer which is held between the first substrate and the second substrate and contains a polymer and a liquid crystal molecule. The light guide layer has a first surface opposed to the display panel, and an edge opposed to the light emitting element. The first optical layer is located between the display panel and the light guide layer. A refractive index of the first optical layer is lower than a refractive index of the light guide layer.

6 Claims, 17 Drawing Sheets

(51) Int. Cl.
*G02F 1/133* (2006.01)
*F21V 8/00* (2006.01)
*G09G 3/36* (2006.01)
*G02F 1/1343* (2006.01)
*G02F 1/13357* (2006.01)

(52) U.S. Cl.
CPC ........ *G02F 1/1343* (2013.01); *G02F 1/13306* (2013.01); *G02F 1/133502* (2013.01); *G09G 3/36* (2013.01); *G02B 6/0036* (2013.01); *G02B 6/0061* (2013.01); *G02F 1/133615* (2013.01); *G02F 1/133616* (2021.01)

(58) Field of Classification Search
CPC ............ G02F 1/133615; G02B 6/0028; G02B 6/0055; G02B 6/0036; G02B 6/0061; G09G 3/36
USPC ...................................................... 349/62–65
See application file for complete search history.

(56) References Cited

U.S. PATENT DOCUMENTS

| | | |
|---|---|---|
| 2010/0020265 A1* | 1/2010 | Senoue ................ G09G 3/3611 349/62 |
| 2010/0085510 A1 | 4/2010 | Okuyama et al. |
| 2012/0014129 A1 | 1/2012 | Chiang |
| 2015/0362812 A1 | 12/2015 | Aoki |
| 2016/0070047 A1 | 3/2016 | Okuyama et al. |
| 2016/0109643 A1* | 4/2016 | Teragawa ............. G02B 6/0061 362/624 |
| 2017/0086296 A1 | 3/2017 | Lee |
| 2018/0274740 A1 | 9/2018 | Watanabe |

FOREIGN PATENT DOCUMENTS

| | | |
|---|---|---|
| JP | 7-104254 A | 4/1995 |
| JP | 2007-157540 A | 6/2007 |
| JP | 2010-092682 | 4/2010 |
| JP | 2016-057338 | 4/2016 |

\* cited by examiner

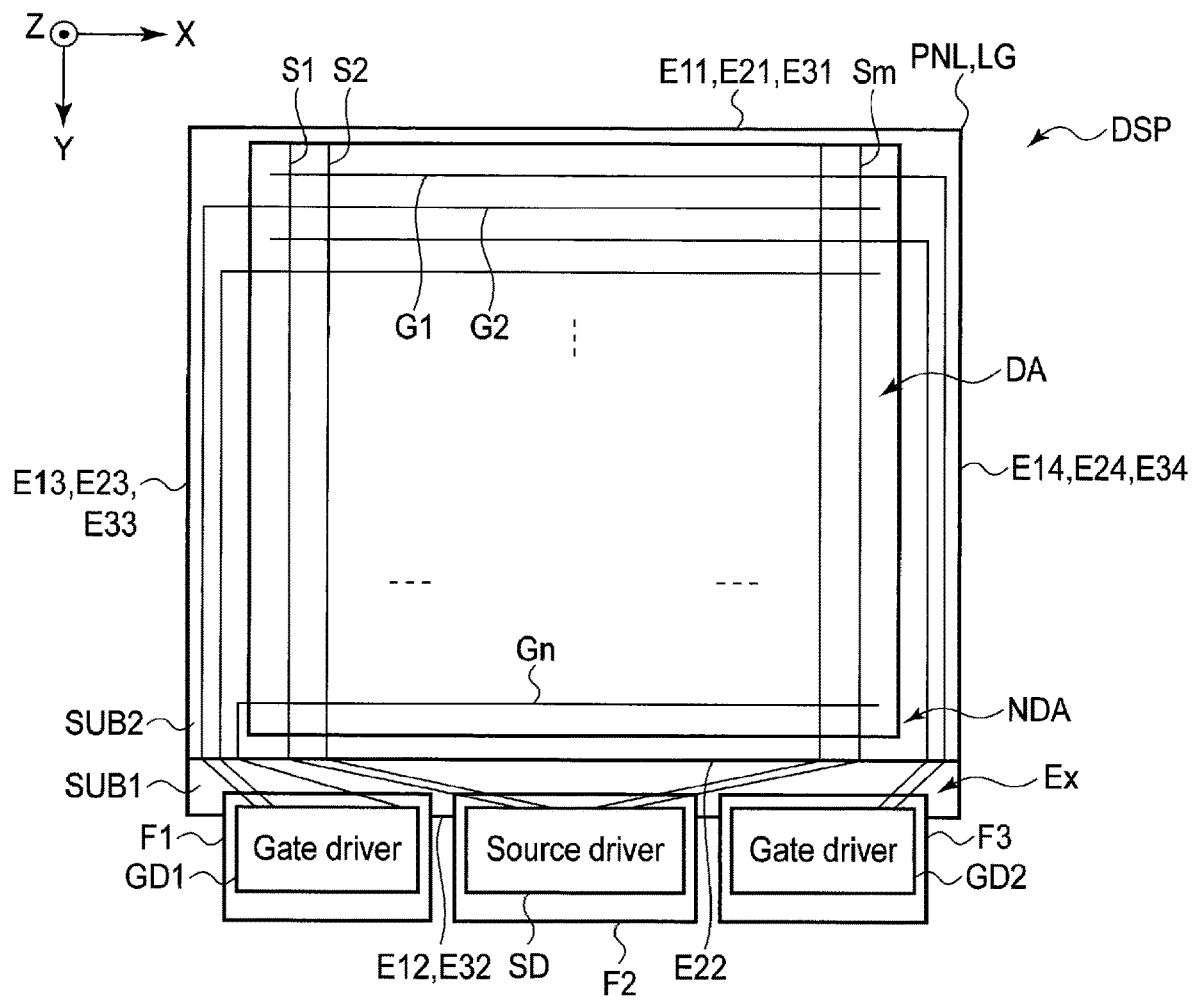
F I G. 1

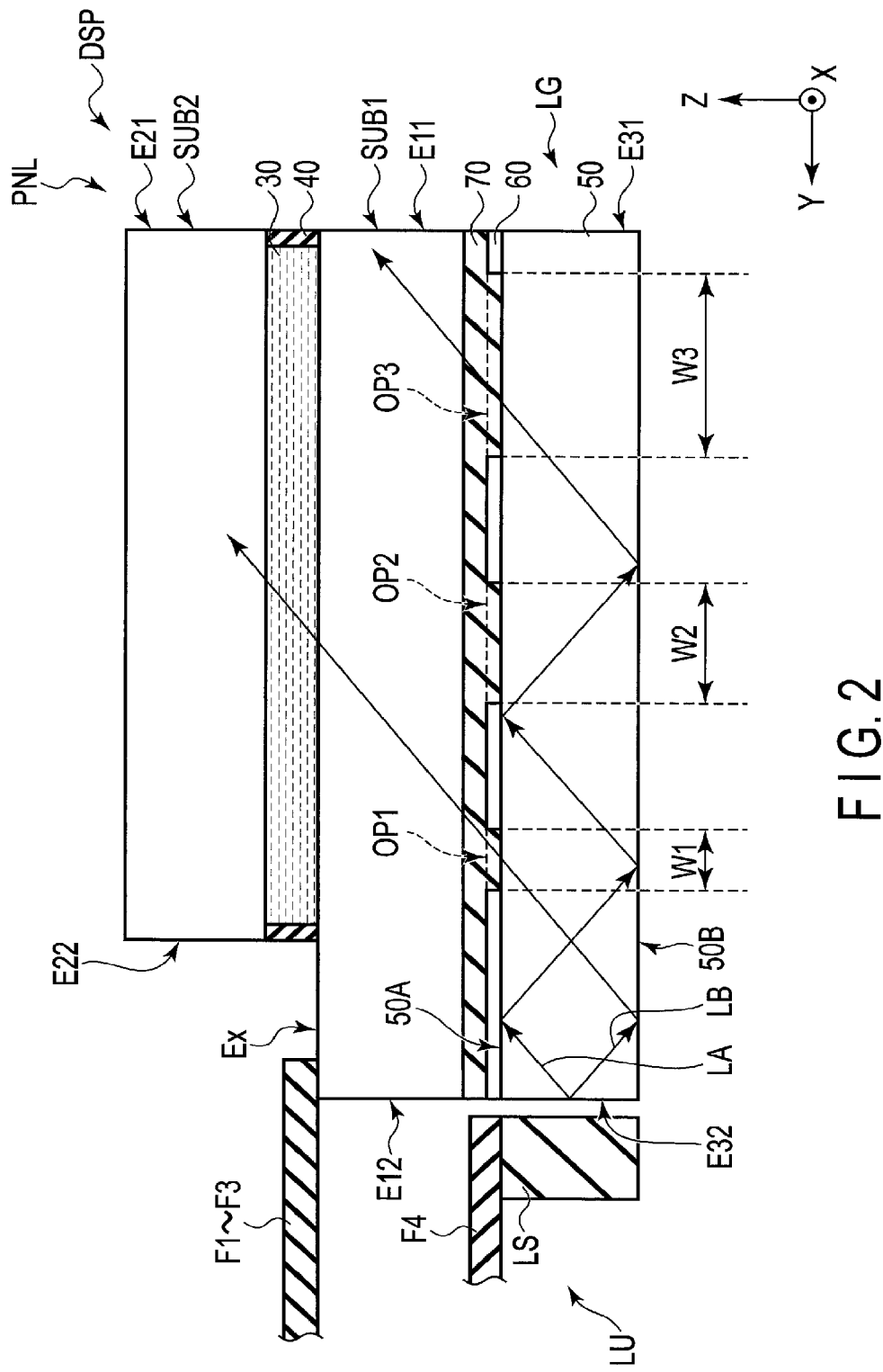
F I G. 2

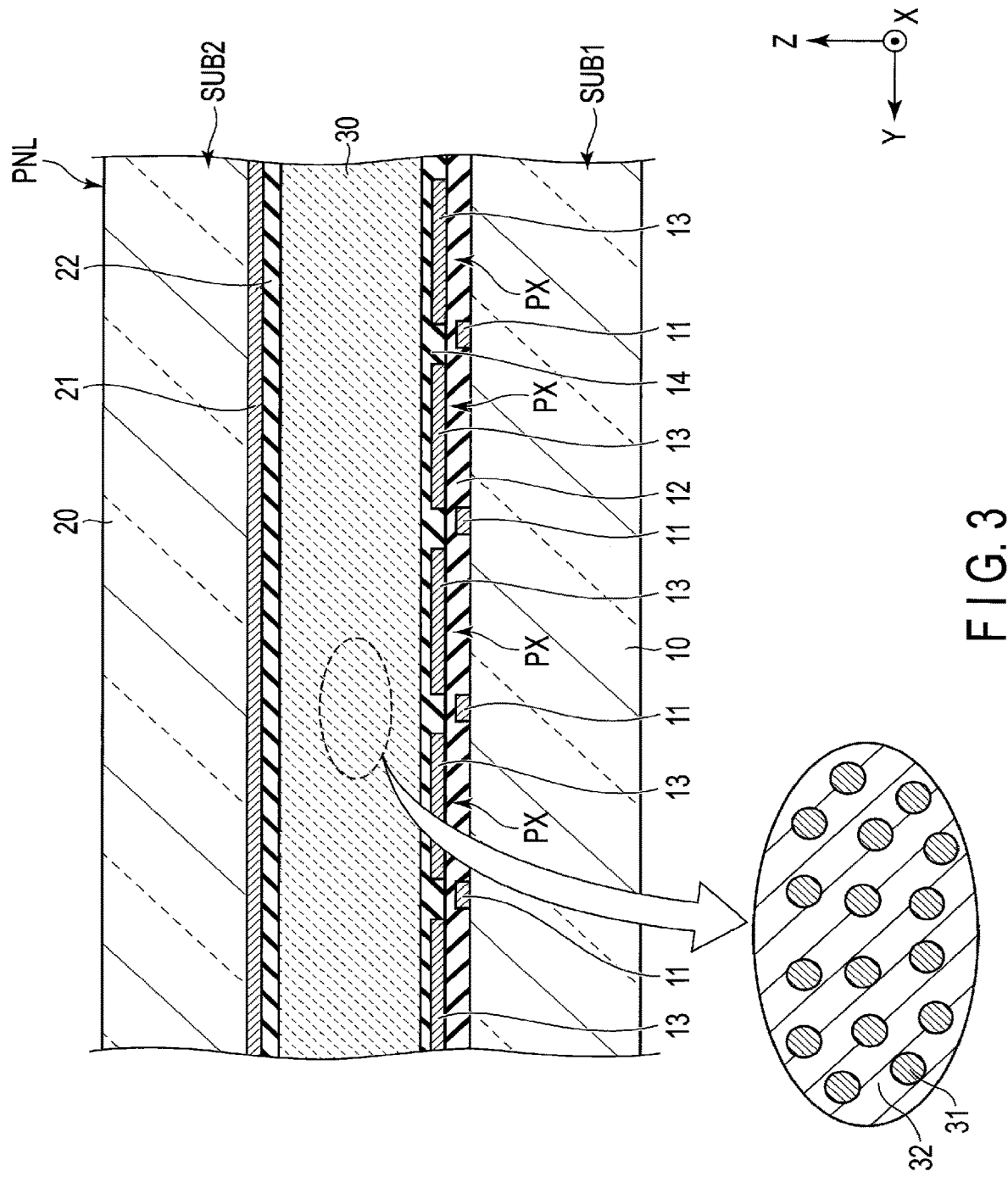
F I G. 3

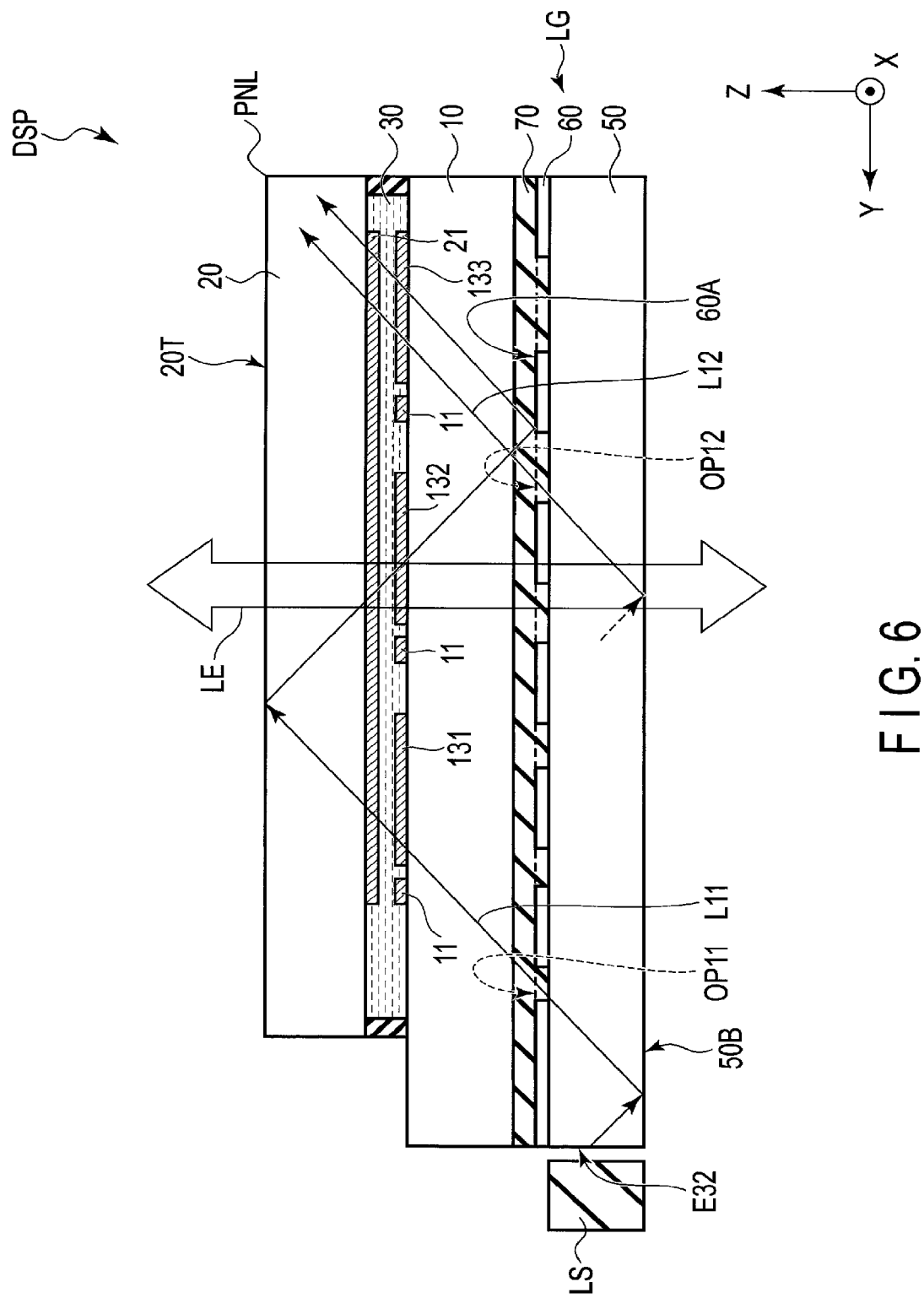
F I G. 6

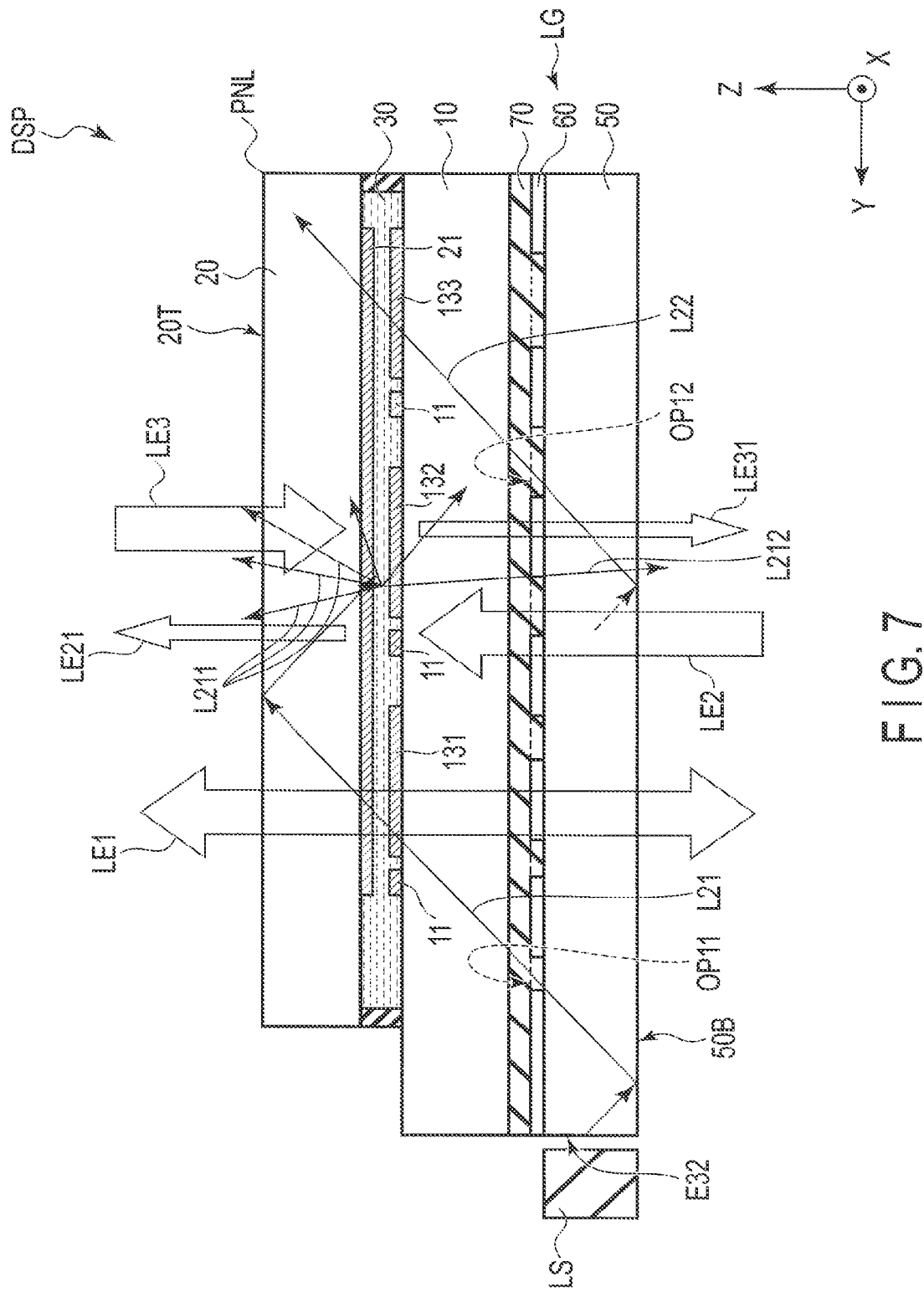
F I G. 7

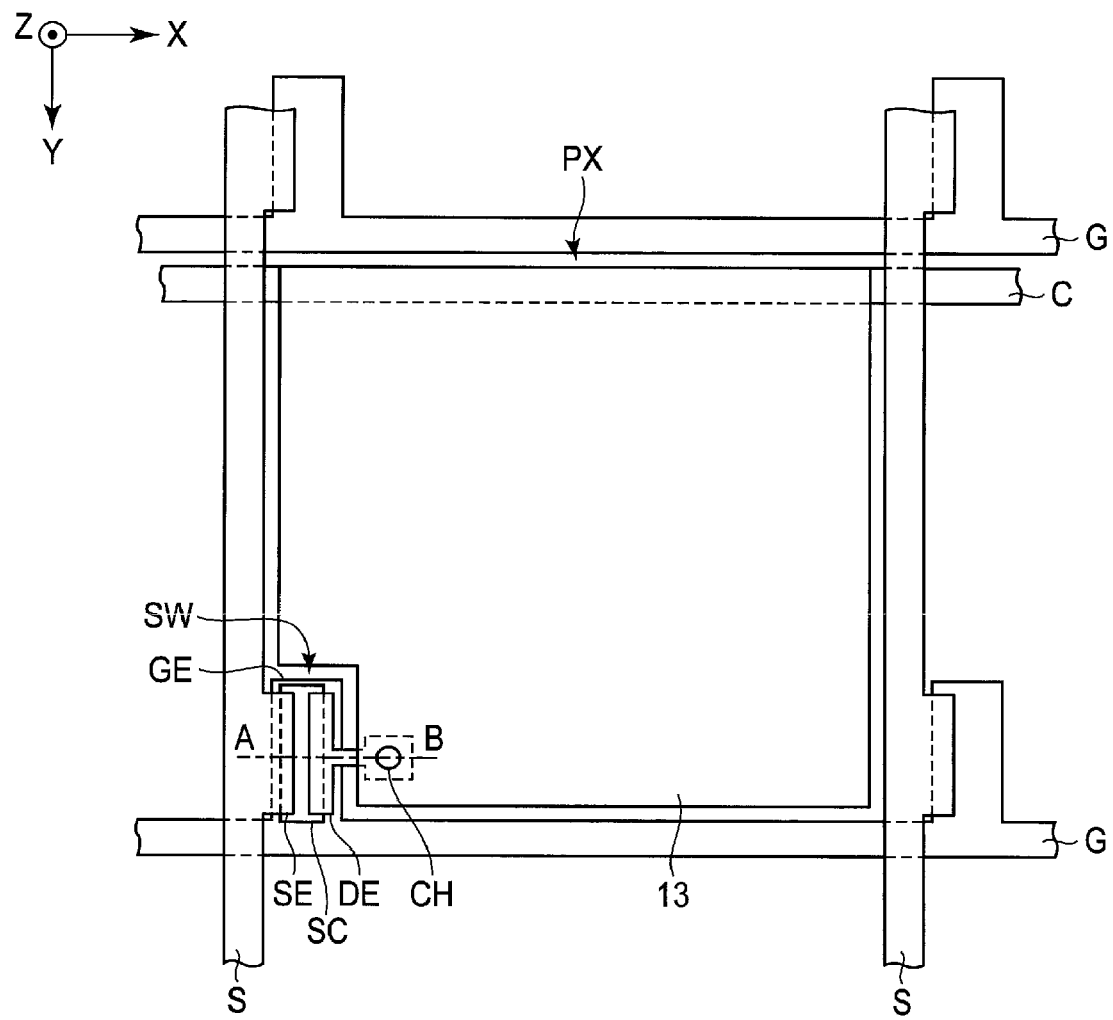
F I G. 8

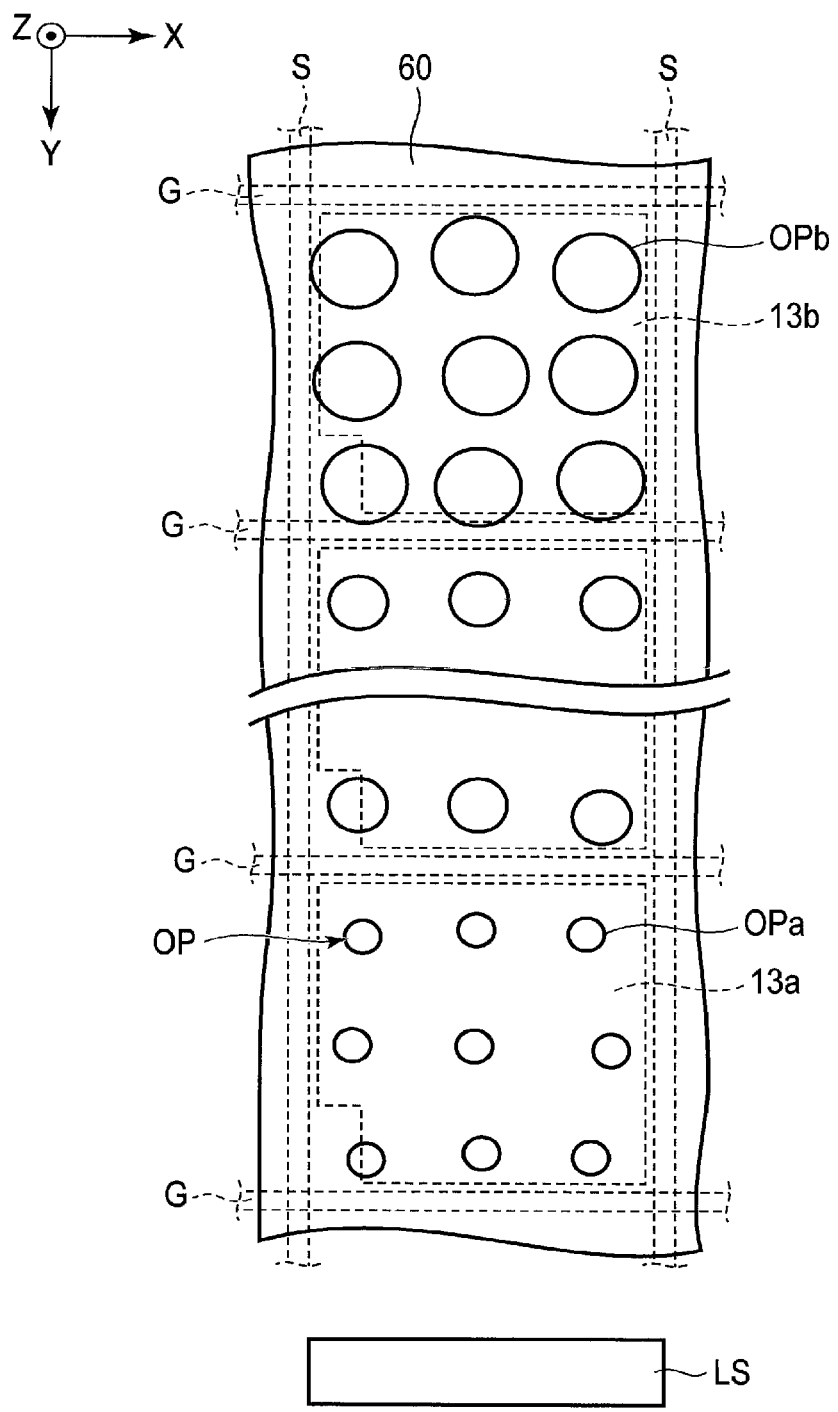
F I G. 10

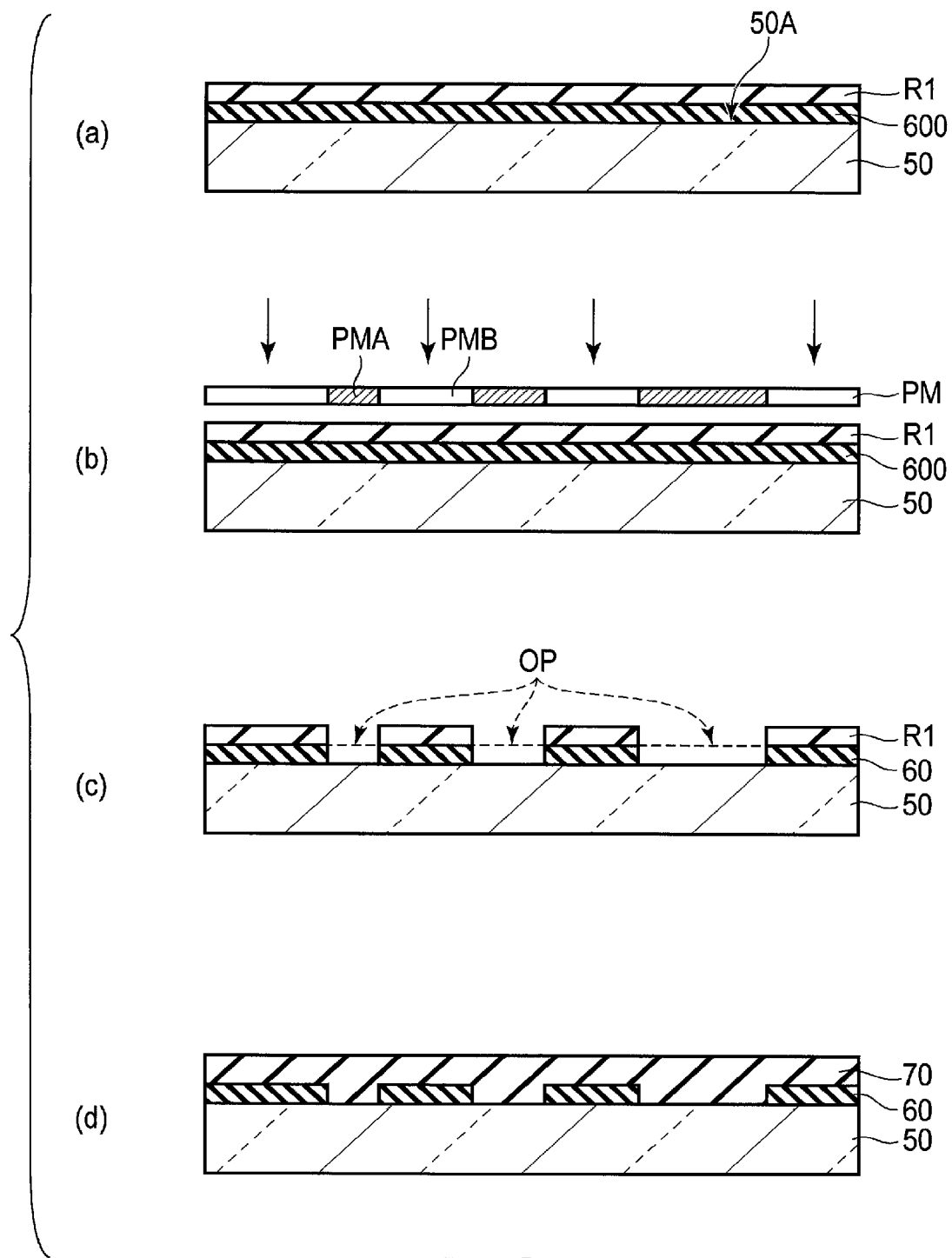
F I G. 11

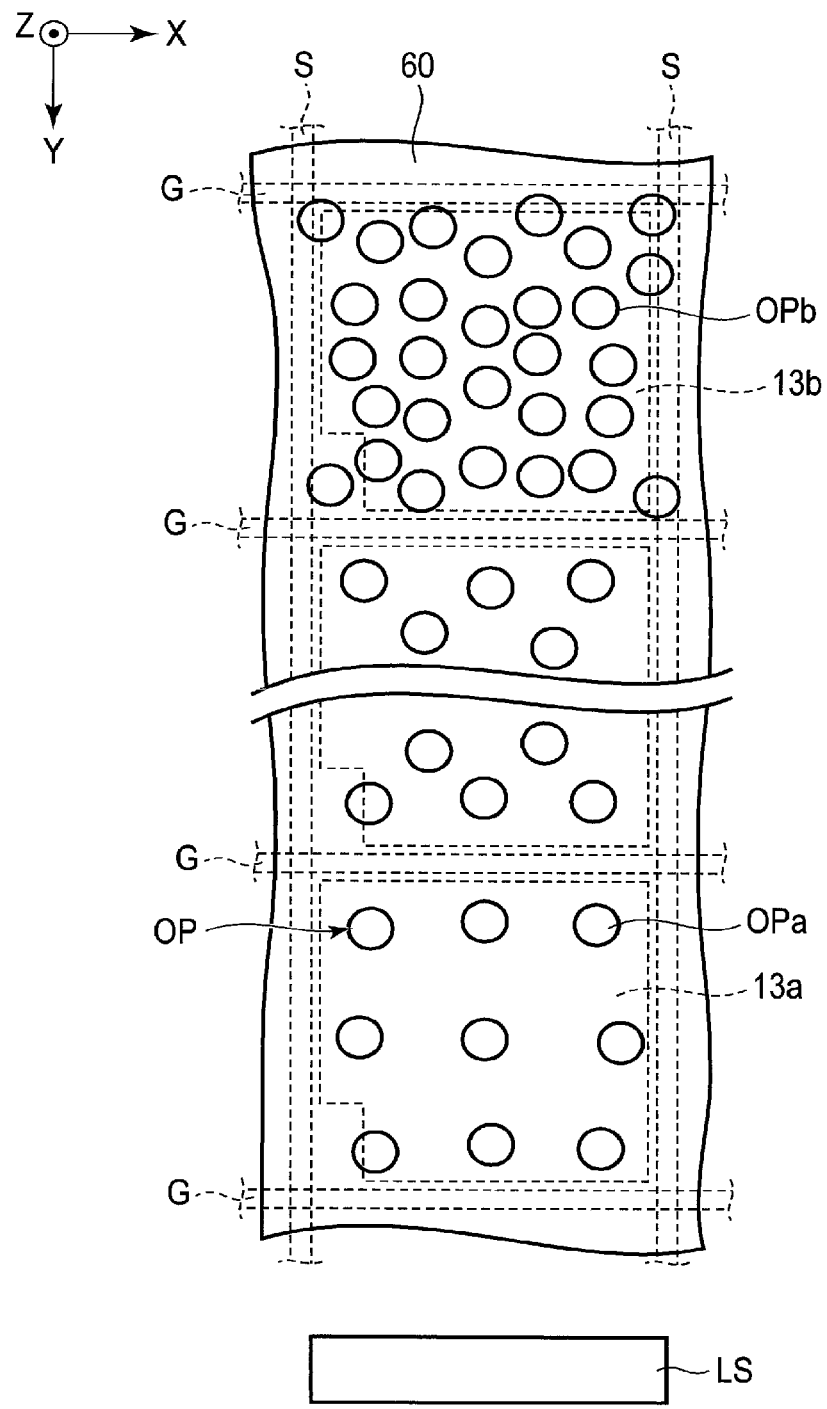
F I G. 12

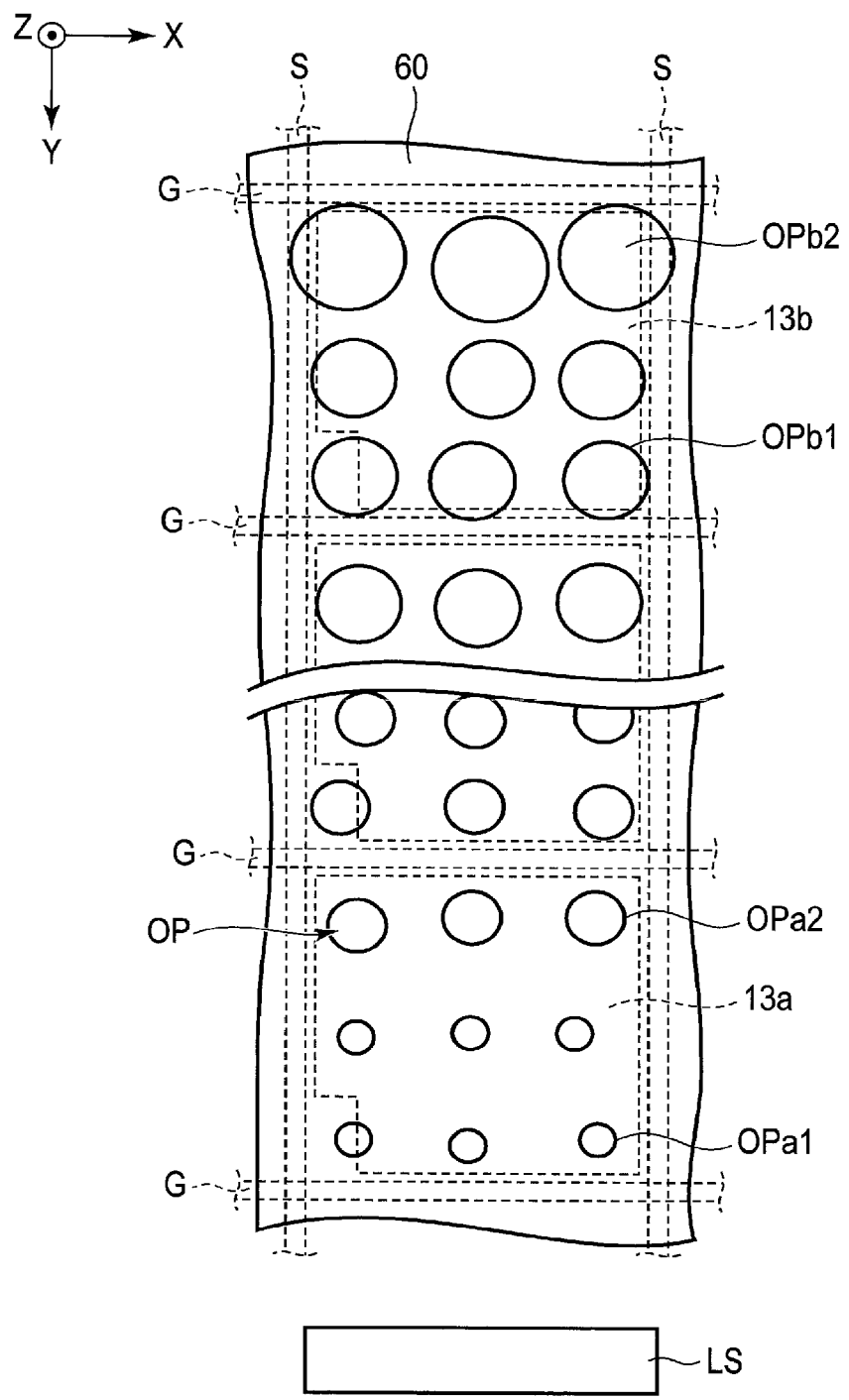
F I G. 14

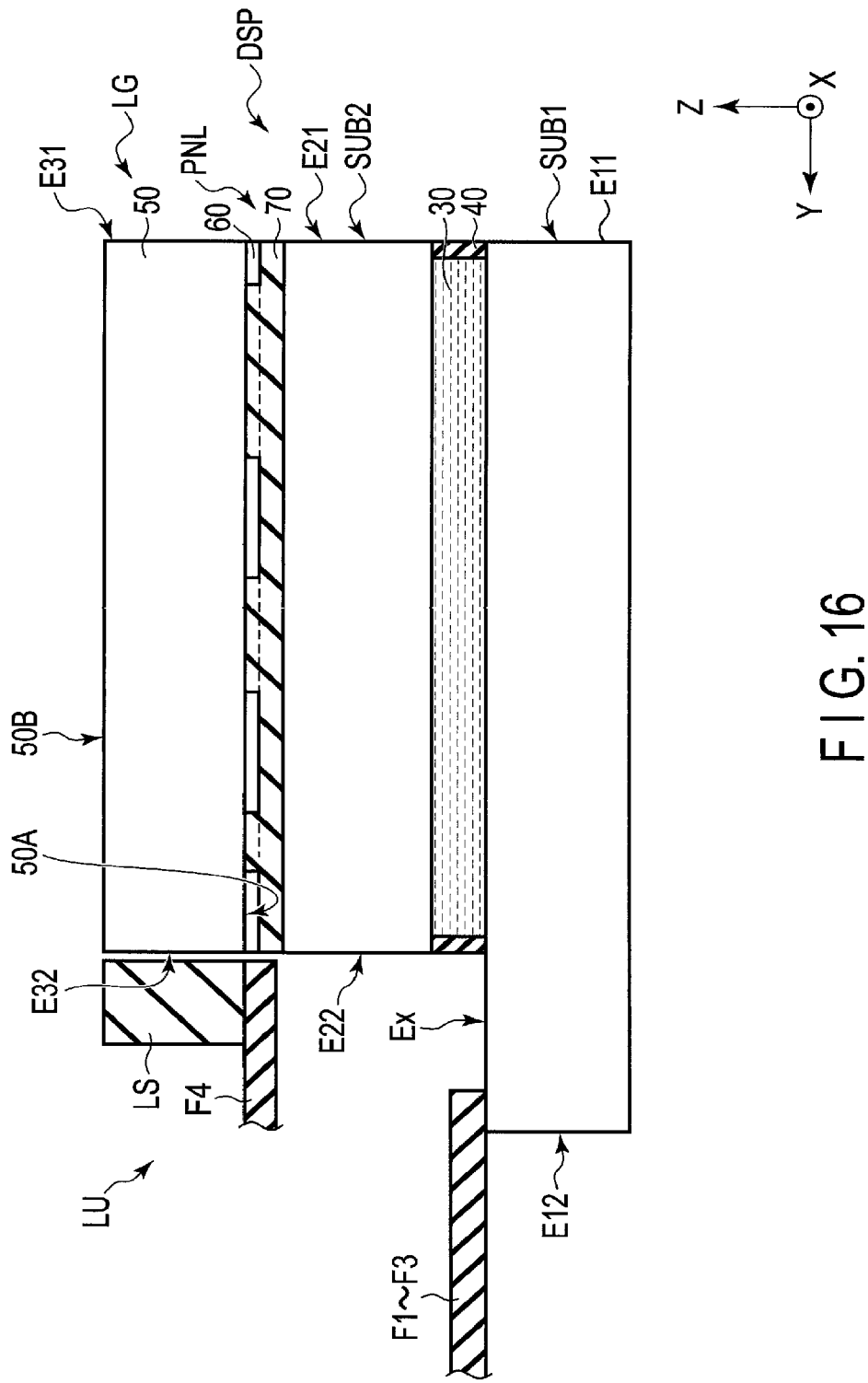
F I G. 16

DISPLAY DEVICE

CROSS-REFERENCE TO RELATED APPLICATIONS

This application is a continuation of and claims the benefit of priority under 35 U.S.C. § 120 from U.S. application Ser. No. 16/053,860 filed Aug. 3, 2018, and claims the benefit of priority under 35 U.S.C. § 119 from Japanese Patent Application No. 2017-152648 filed Aug. 7, 2017, the entire contents of each of which are incorporated herein by reference.

FIELD

Embodiments described herein relate generally to a display device.

BACKGROUND

Recently, various display devices using polymer dispersed liquid crystals (hereinafter referred to also as PDLCs) which can switch between a scattering state in which entering light is scattered and a transmitting state in which entering light is transmitted have been proposed. In a display device using PDLCs, an illumination device which emits light to a display panel may be arranged on the side of an edge of the display panel in some cases. In this structure, due to scattering of light in the display panel, etc., the luminance of an area which is far from a light emitting element may become lower than the luminance of an area which is close to the light emitting element.

BRIEF DESCRIPTION OF THE DRAWINGS

FIG. 1 is a plan view showing an example of the structure of a display device DSP according to the present embodiment.

FIG. 2 is a sectional view of the display device DSP shown in FIG. 1.

FIG. 3 is a sectional view showing an example of the structure of a display panel PNL shown in FIG. 2.

FIG. 6 is a sectional view of the display device DSP when the liquid crystal layer 30 is in the transparent state.

FIG. 7 is a sectional view of the display device DSP when the liquid crystal layer 30 is in the scattering state.

FIG. 8 is a plan view showing an example of a pixel PX.

FIG. 10 is a plan view showing an example of the relationship between an opening OP of an optical layer 60 and a pixel electrode 13.

FIG. 11 is a sectional view showing a method of forming a light guide element LG.

FIG. 12 is a plan view showing another example of the optical layer 60.

FIG. 14 is a plan view showing another example of the optical layer 60.

FIG. 16 is a sectional view showing another example of the display device DSP.

DETAILED DESCRIPTION

Figure 4:
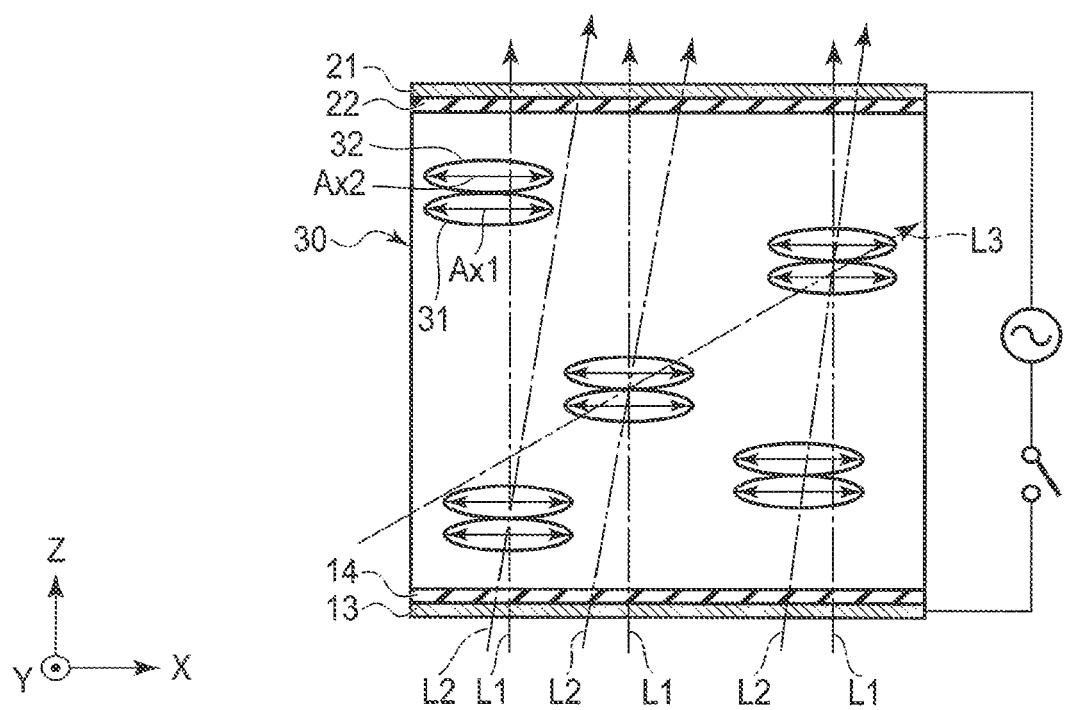
FIG. 4 is a diagram schematically showing a transparent state of a liquid crystal layer 30.

In general, according to one embodiment, there is provided a display device including a display panel, a light emitting element, a light guide layer and a first optical layer. The display panel includes a first substrate, a second substrate which is opposed to the first substrate, and a polymer dispersed liquid crystal layer which is held between the first substrate and the second substrate and contains a polymer and a liquid crystal molecule. The light guide layer has a first surface which is opposed to the display panel, and an edge which is opposed to the light emitting element. The first optical layer is located between the display panel and the light guide layer. A refractive index of the first optical layer is lower than a refractive index of the light guide layer.

According to another embodiment, there is provided a display device including a display panel, a light emitting element, a light guide layer and a first optical layer. The display panel includes a first substrate, a second substrate which is opposed to the first substrate, a sealant which is located between the first substrate and the second substrate, and a polymer dispersed liquid crystal layer which is located within an area surrounded by the sealant and contains a polymer and a liquid crystal molecule. The light guide layer has a first surface which is opposed to the display panel, and a first edge which is opposed to the light emitting element. The first optical layer is arranged along the first surface between the display panel and the light guide layer and extends from the first edge to a position overlapping at least the sealant. A refractive index of the first optical layer is lower than a refractive index of the light guide layer.

According to still another embodiment, there is provided a display device including a light emitting element, a light guide layer, a display panel, a second optical layer and a third optical layer. The light guide layer has a first surface, an edge which is opposed to the light emitting element, and a second surface which is opposite to the first surface. The display panel has a third surface which is opposite to a surface opposed to the first surface, and includes a polymer dispersed liquid crystal layer which contains a polymer and a liquid crystal molecule. The second optical layer is opposed to the entire second surface. The third optical layer is opposed to the entire third surface. A refractive index of the second optical layer and a refractive index of the third optical layer are lower than a refractive index of the light guide layer.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a plan view showing an example of the structure of a display device DSP according to the present embodiment. In the drawings, a first direction X and a second direction Y intersect each other, and a third direction Z intersects the first direction X and the second direction Y. The first direction X, the second direction Y and the third direction Z orthogonally intersect each other, for example, but may intersect each other at an angle other than 90 degrees. In the present specification, the direction of the pointing end of an arrow indicating the third direction Z is referred to as above, and the opposition direction to the pointing end of the arrow is referred to as below. Such expressions as "a second member above a first member" and "a second member below a first member" mean that the second member may be in contact with the first member or may be apart from the first member. Further, assuming that a viewing position to view the display device DSP is located on the pointing end side of the arrow indicating the third direction Z, a view in an X-Y plane defined by the first direction X and the second direction Y from this viewing position is defined as a planar view.

In the present embodiment, a display device adopting polymer dispersed liquid crystals will be described as an example of the display device. The display device DSP includes a display panel PNL, wiring substrates F1 to F3, a light guide element LG and a light source unit which is not shown in this drawing.

The display panel PNL includes a first substrate SUB1 and a second substrate SUB2. The first substrate SUB1 and the second substrate SUB2 overlap each other in a planar view. The display panel PNL includes a display area DA which displays an image, and a frame-like non-display area NDA which surrounds the display area DA. The display area DA is located in an area in which the first substrate SUB1 and the second substrate SUB2 overlap each other. The display panel PNL includes n scanning lines G (G1 to Gn) and m signal lines S (S1 to Sm) in the display area DA. Both n and m are positive integers, and n and m may be equal to each other or may be different from each other. The scanning lines G extend in the first direction X and are arranged at intervals in the second direction Y. The signal lines S extend in the second direction Y and are arranged at intervals in the first direction X.

The first substrate SUB1 has edges E11 and E12 which extend in the first direction X and edges E13 and E14 which extend in the second direction Y. The second substrate SUB2 has edges E21 and E22 which extend in the first direction X and edges E23 and E24 which extend in the second direction Y. In a planar view, the edge E11 and the edge E21, the edge E13 and the edge E23, and the edge E14 and the edge E24 overlap each other, respectively, in the example illustrated but may not overlap each other. The edge E22 is located between the edge E12 and the display area DA in a planar view. The first substrate SUB1 has an extension portion Ex between the edge E12 and the edge E22.

The wiring substrates F1 to F3 are connected to the extension portion Ex and are arranged in this order in the first direction X. The wiring substrate F1 includes a gate driver GD1. The wiring substrate F2 includes a source driver SD. The wiring substrate F3 includes a gate driver GD2. The wiring substrate F1 to F3 may be replaced with a single wiring substrate.

The signal lines S are drawn to the non-display area NDA and are connected to the source driver SD. The scanning lines G are drawn to the non-display area NDA and are connected to the gate drivers GD1 and GD2. In the example illustrated, the odd-numbered scanning lines G are drawn between the edge E14 and the display area DA and are connected to the gate driver GD2. Further, the even-numbered scanning lines G are drawn between the edge E13 and the display area DA and are connected to the gate driver GD1. The connection relationship of the gate drivers GD1 and GD2 to the scanning lines G are not limited to that of the example illustrated.

The light guide element LG is located below the display panel PNL. For example, the light guide element LG has the same shape as that of the first substrate SUB1 and overlaps the entire first substrate SUB1. The light guide element LG has edges E31 and E32 which extend in the first direction X and edges E33 and E34 which extend in the second direction Y. In the example illustrated, the edge E31 overlaps the edges E11 and E21, the edge E32 overlaps the edge E12, the edge E33 overlaps the edges E13 and E23, and the edge E34 overlaps the edges E14 and E24.

FIG. 2 is a sectional view of the display device DSP shown in FIG. 1. Here, only the major part will be explained in a cross-section of the display device DSP in a Y-Z plane defined by the second direction Y and the third direction Z.

The display device DSP includes a light source unit LU in addition to the display panel PNL, the wiring substrates F1 to F3 and the light guide element LG.

The display panel PNL includes a liquid crystal layer 30 held between the first substrate SUB1 and the second substrate SUB2. The first substrate SUB1 and the second substrate SUB2 are attached together by a sealant 40. The liquid crystal layer 30 is located within an area surrounded by the sealant 40. In the example illustrated, the extension portion Ex extends beyond the second substrate SUB2 in the second direction Y.

The light source unit LU is located on the extension portion Ex side in the second direction Y, for example. The light source unit LU includes a light emitting element LS as a light source, a wiring substrate F4, etc. The light emitting element LS is connected to the wiring substrate F4. In the example illustrated, the wiring substrate F4 and the light emitting element LS are located below the wiring substrates F1 to F3.

The light guide element LG is opposed to the first substrate SUB1, for example. The light guide element LG includes a light guide layer 50 and an optical layer 60. The light guide layer 50 has a first surface 50A which is opposed to the display panel PNL and a second surface 50B which is opposite to the first surface 50A. The edge E32 is opposed to the light emitting element LS. For example, the light emitting element LS is only opposed to the light guide layer 50. In the example illustrated, the first surface 50A and the second surface 50B are surfaces parallel to the X-Y plane. The light guide layer 50 is formed of a transparent material such as glass, acrylic or polycarbonate. Non-transparent members are not provided below the second surface 50B.

The optical layer 60 is located between the display panel PNL and the light guide layer 50. In the example illustrated, the optical layer 60 contacts the first surface 50A. The optical layer 60 overlaps at least the extension portion Ex. In the example illustrated, the optical layer 60 also overlaps the sealant 40. That is, the optical layer 60 extends from the edge E32 to a position overlapping the sealant 40 in the second direction Y. The optical layer 60 also overlaps the sealant 40 on the edge E31 side. The optical layer 60 is formed of fluorine resin or silicon resin, and is transparent and is a haze-free material.

In the present embodiment, the optical layer 60 has a plurality of openings OP (OP1, OP2 and OP3). The openings OP are formed in areas which overlap the liquid crystal layer 30. The opening OP2 is farther from the light emitting element LS than the opening OP1. The opening OP3 is farther from the light emitting element LS than the opening OP2. In the example illustrated, a width W2 of the opening OP2 is greater than a width W1 of the opening OP1. A width W3 of the opening OP3 is greater than the width W2. The widths here correspond to a dimension in the second direction Y.

The light guide element LG is attached to the display panel PNL by a transparent adhesive layer 70. In the example illustrated, the adhesive layer 70 is interposed between the display panel PNL and the optical layer 60 and is also provided in the openings OP. That is, the adhesive layer 70 contacts the display panel PNL, the optical layer 60 and the light guide layer 50. Although not shown in the drawing, the optical layer 60 may contact the display panel PNL. Further, the adhesive layer 70 may be interposed between the optical layer 60 and the light guide layer 50. Still further, the openings OP may be filled and flattened with an overcoat material having the same refractive index as that of the light guide element LG, in place of the adhesive layer 70. In this case, the light guide element LG may be attached to the display panel PNL by a film-like adhesive sheet having the same refractive index as those of the first substrate SUB1 and the overcoat.

In the present embodiment, the refractive index of the optical layer 60 is lower than the refractive index of the light guide layer 50. Further, the refractive index of air is lower than the refractive index of the light guide layer 50. In the present structure, light which enters the light guide layer 50 from the light emitting element LS is reflected at the border of the light guide layer 50 and the optical layer 60 (that is, by the first surface 50A) and at the border of the light guide layer 50 and air (that is, by the second surface 50B) and travels through the light guide layer 50. As described above, the light emitting element LS is only opposed to the light guide layer 50, and therefore the light emitted from the light emitting element LS hardly enters the optical layer 60, the adhesive layer 70 and the first substrate SUB1 directly. On the other hand, the refractive index of the adhesive layer 70 is higher than the refractive index of the optical layer 60 and is substantially equal to the refractive index of the light guide layer 50. Therefore, the light traveling through the light guide layer 50 is hardly reflected at the border of the light guide layer 50 and the adhesive layer 70. In other words, part of the light traveling through the light guide layer 50 enters the display panel PNL through the openings OP.

In the example illustrated, of the light entering the light guide layer 50, light LA which travels toward the first surface 50A side is reflected at the border of the light guide layer 50 and the optical layer 60. After reflected at the border of the light guide layer 50 and air and at the border of the light guide layer 50 and the optical layer 60 repeatedly, the light enters the display panel PNL through the opening OP3. Of the light entering the light guide layer 50, light LB which travels toward the second surface 50B side is reflected at the border of the light guide layer 50 and air and then enters the display panel PNL thorough the opening OP1. Although not shown in the drawing, part of the light traveling through the light guide layer 50 may enter the display panel PNL through the opening OP2 in some cases. Further, part of the light traveling through the display panel PNL may enter the light guide layer 50 through the openings OP in some cases.

FIG. 3 is a sectional view showing an example of the structure of the display panel PNL shown in FIG. 2. The first substrate SUB1 includes a transparent substrate 10, a wiring line 11, an insulating layer 12, a pixel electrode 13 and an alignment film 14. The second substrate SUB2 includes a transparent substrate 20, a common electrode 21 and an alignment film 22. Note that the second substrate SUB2 does not include a light-shielding layer which overlaps the wiring line 11.

The transparent substrates 10 and 20 are insulating substrates such as glass substrates or plastic substrates. The wiring line 11 is formed of a non-transparent metal such as molybdenum, tungsten, aluminum, titanium or silver. The wiring line 11 extend in the first direction X in the example illustrate but may extend in the second direction Y. The insulating layer 12 is formed of a transparent insulating material. The pixel electrode 13 and the common electrode 21 are formed of a transparent conductive material such as indium tin oxide (ITO) or indium zinc oxide (IZO). Each pixel electrode 13 is arranged in each pixel PX. The common electrode 21 is arranged over the pixels PX. The alignment films 14 and 22 may be horizontal alignment films having the force of regulating alignment substantially parallel to the X-Y plane or may be vertical alignment films having the force of regulating alignment substantially parallel to the third direction Z.

The liquid crystal layer 30 is located between the alignment film 14 and the alignment film 22. The liquid crystal layer 30 includes polymer dispersed liquid crystals containing polymers 31 as polymer compounds and liquid crystal molecules 32. For example, the polymer 31 is a liquid crystal polymer. A polymer is obtained, for example, by polymerizing a liquid crystal monomer in the state of being aligned in a predetermined direction by the alignment regulation forces of the alignment films 14 and 22. For example, the alignment treatment directions of the alignment films 14 and 22 correspond to the first direction X, the alignment films 14 and 22 have alignment regulation forces in the first direction X. Therefore, the polymers 31 are formed into streaks which extend in the first direction X. The liquid crystal molecules 32 are dispersed in the gap between the polymers 31 and are aligned such that major axes thereof are aligned with the first direction X. In the enlarged part of the drawing, the polymer 31 is shown by rising diagonal lines and the liquid crystal molecule 32 is shown by falling diagonal lines.

Each of the polymer 31 and the liquid crystal molecule 32 has an optical anisotropy or a refractive index anisotropy. The liquid crystal molecule 32 may be a positive type liquid crystal molecule having a positive dielectric constant anisotropy or may be a negative type liquid crystal molecule having a negative dielectric constant anisotropy. The polymer 31 and the liquid crystal molecule 32 respond to an electric field differently. The polymer 31 is less responsive to an electric field than the liquid crystal molecule 32 to an electric field.

FIG. 4 is a diagram schematically showing a transparent state of the liquid crystal layer 30. The example illustrated corresponds to a state where voltage is not applied to the liquid crystal layer 30 (a state where the electric potential difference between the pixel electrode 13 and the common electrode 21 is substantially zero, for example). An optical axis Ax1 of the polymer 31 and an optical axis Ax2 of the liquid crystal molecule 32 are parallel to each other. In the example illustrated, the optical axis Ax1 and the optical axis Ax2 are parallel to the first direction X. The polymer 31 and the liquid crystal molecule 32 have substantially the same refractive index anisotropy. That is, the ordinary refractive index of the polymer 31 and the ordinary refractive index of the liquid crystal molecule 32 are substantially equal to each other, and the extraordinary refractive index of the polymer 31 and the extraordinary refractive index of the liquid crystal molecule 32 are substantially equal to each other. Therefore, the polymer 31 and the liquid crystal molecule 32 have hardly any refractive index difference in all directions including the first direction X, the second direction Y and the third direction Z. Consequently, light L1 which have entered the liquid crystal layer 30 in the third direction Z is hardly scattered in the liquid crystal layer 30 and is transmitted through the liquid crystal layer 30. Similarly, light L2 and light L3 which have entered the liquid crystal layer 30 in oblique directions which are inclined with respect to the third direction Z are hardly scattered in the liquid crystal layer 30. Therefore, high transparency can be achieved. The state shown in FIG. 4 is referred to as a transparent state. For example, light L3 corresponds to the light emitted from the light emitting element LS shown in FIG. 2, and is hardly scattered in the liquid crystal layer 30 and travels in the opposite direction to the direction of the arrow of the second direction Y.

Figure 5:
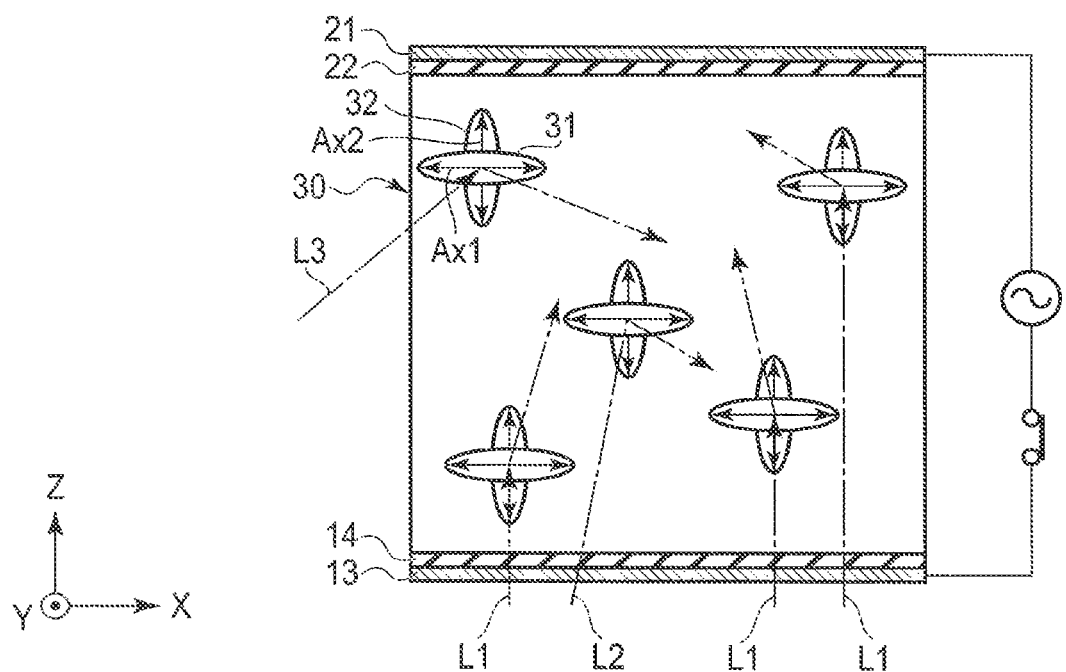
FIG. 5 is a diagram schematically showing a scattering state of the liquid crystal layer 30.

FIG. 5 is a diagram schematically showing a scattering state of the liquid crystal layer 30. The example illustrated corresponds to a state where voltage is applied to the liquid crystal layer 30 (a state where the electric potential difference between the pixel electrode 13 and the common electrode 21 is greater than or equal to a threshold value, for example). As described above, the polymer 31 is less responsive to an electric field than the liquid crystal molecule 32 to an electric field. For example, the alignment direction of the polymer 31 hardly changes regardless of the presence or absence of an electric field. On the other hand, the alignment direction of the liquid crystal molecule 32 changes in accordance with an electric field in a state where voltage higher than or equal to the threshold value is applied to the liquid crystal layer 30. That is, the optical axis Ax1 is substantially parallel to the first direction X, whereas the optical axis Ax2 is inclined with respect to the first direction X as shown in the drawing. If the liquid crystal molecule 32 is a positive type liquid crystal molecule, the liquid crystal molecule 32 is aligned such that a major axis thereof is aligned with an electric field. An electric field between the pixel electrode 13 and the common electrode 21 is produced in the third direction Z. Therefore, the liquid crystal molecule 32 is aligned such that a major axis thereof or the optical axis Ax2 is aligned with the third direction Z. That is, the optical axes Ax1 and Ax2 intersect each other. Therefore, a large refractive index difference is caused between the polymer 31 and the liquid crystal molecule 32 in all directions including the first direction X, the second direction Y and the third direction Z. Accordingly, the light L1 to the light L3 which have entered the liquid crystal layer 30 are scattered in the liquid crystal layer 30. The state shown in FIG. 5 is referred to as a scattering state.

FIG. 6 is a sectional view of the display device DSP when the liquid crystal layer 30 is in the transparent state. The light emitted from the light emitting element LS enters the light guide layer 50 from the edge E32 and travels through the light guide layer 50. Of the light traveling through the light guide layer 50, light L11 which enters the display panel PNL from an opening OP11 and light L12 which enters the display panel PNL from an opening OP12 travel through the liquid crystal layer 30, the transparent substrate 10, the transparent substrate 20, etc. The opening OP11 is closer to the light emitting element LS than the opening OP12 in the second direction Y.

In the example illustrated, after the light L11 enters the liquid crystal layer 30 which overlaps a pixel electrode 131, the light L11 is reflected at the border of the transparent substrate 20 and air (that is, by an upper surface 20T of the transparent substrate 20) and enters the liquid crystal layer 30 which overlaps a pixel electrode 132. Subsequently, the light L11 is reflected at the border of the adhesive layer 70 and the optical layer 60 (that is, by an upper surface 60A of the optical layer 60) and enters the liquid crystal layer 30 which overlaps a pixel electrode 133. Further, in the example illustrated, the light L12 enters the liquid crystal layer 30 which overlaps the pixel electrode 133.

The liquid crystal layer 30 which overlaps the wiring line 11 and the liquid crystal layer 30 which overlaps the pixel electrodes 131, 132 and 133 are in the transparent state. Therefore, the light L11 and the light L12 are hardly scattered in the liquid crystal layer 30. Consequently, the light L11 and the light L12 hardly leak from the second surface 50B of the light guide layer 50 and the upper surface 20T of the transparent substrate 20 and travel through the display panel PNL.

External light LE which enters the display panel PNL is hardly scattered in the liquid crystal layer 30 and is transmitted through the liquid crystal layer 30. That is, external light LE which has entered the display panel PNL from the second surface 50B is transmitted through the upper surface 20T, and external light LE which has entered the display panel PNL from the upper surface 20T is transmitted through the second surface 50B. Therefore, when the user views the display panel PNL from the upper surface 20T side, the user can see a view on the second surface 50B side through the display panel PNL. Similarly, when the user views the display panel PNL from the second surface 50B side, the user can see a view on the upper surface 20T side through the display panel PNL.

FIG. 7 is a sectional view of the display device DSP when the liquid crystal layer 30 is in the scattering state. The light emitted from the light emitting element LS enters the light guide layer 50 from the edge E32 and travels through the light guide layer 50. Of the light traveling through the light guide layer 50, light L21 which enters the display panel PNL from the opening OP11 and light L22 which enters the display panel PNL from the opening OP12 travel through the liquid crystal layer 30, the transparent substrate 10, the transparent substrate 20, etc.

In the example illustrated, the liquid crystal layer 30 which overlaps the wiring line 11 is maintained in the transparent state. Further, the liquid crystal layer 30 which overlaps the pixel electrode 131 is in the transparent state. Therefore, the light L21 is hardly scattered in areas of the liquid crystal layer 30 which overlap the wiring line 11 and the pixel electrode 131. On the other hand, the liquid crystal layer 30 which overlaps the pixel electrode 132 is in the scattering state. Therefore, the light L21 is scattered in an area of the liquid crystal layer 30 which overlaps the pixel electrode 132. One part of the light L21 referred to as scattering light L211 is transmitted through the upper surface 20T, another part of the light L21 referred to as scattering light L212 is transmitted through the second surface 50B, and the other scattering light travels through the display panel PNL.

Meanwhile, in the example illustrated, the light L22 enters an area of the liquid crystal layer 30 which overlaps the pixel electrode 133. The liquid crystal layer 30 which overlaps the pixel electrode 133 is in the transparent state. Therefore, the light L22 is hardly scattered in areas of the liquid crystal layer 30 which overlap the wiring line 11 and the pixel electrode 133. Therefore, the light L22 hardly leaks from the second surface 50B and the upper surface 20T and travels through the display panel PNL. As described above, even if part of the light L21 is scattered in the liquid crystal layer 30, the light L22 enters an area of the liquid crystal layer 30 which is far from the light emitting element LS than an area of the liquid crystal layer 30 in the scattering state.

In the area overlapping the pixel electrode 131, external light LE1 which enters the display panel PNL is hardly scattered in the liquid crystal layer 30 and is transmitted through the liquid crystal layer 30 similarly to the external light LE shown in FIG. 6. In the area overlapping the pixel electrode 132, external light LE2 which enters from the second surface 50B is scattered in the liquid crystal layer 30, and part of the external light LE2 referred to as light LE21 is transmitted through the upper surface 20T. Further, external light LE3 which enters from the upper surface 20T is scattered in the liquid crystal layer 30, and part of the external light LE3 referred to as light LE31 is transmitted through the second surface 50B. Therefore, when the user views the display panel PNL from the upper surface 20T side, the user can visually recognize the color of the light L21 in the area overlapping the pixel electrode 132. Further, since the external light LE21 is transmitted through the display panel PNL, the user can see a view on the second surface 50B side through the display panel PNL. Similarly, when the user views the display panel PNL from the second surface 50B side, the user can visually recognize the color of the light L21 in the area overlapping the pixel electrode 132. Further, since the external light LE31 is transmitted through the display panel PNL, the user can see a view on the upper surface 20T side through the display panel PNL.

In the area overlapping the pixel electrode 131, since the liquid crystal layer 30 is in the transparent state, the color of the light L21 is hardly visually recognized, and the user can see a view behind the display panel PNL through the display panel PNL. Further, in the area overlapping the pixel electrode 133, since the liquid crystal layer 30 is in the transparent state, the color of the light L22 is hardly visually recognized, and the user can see a view behind the display panel PNL through the display panel PNL.

FIG. 8 is a plan view showing an example of the pixel PX. In the example illustrated, the pixel PX is partitioned with two signal lines S arranged in the first direction X and two scanning lines G arranged in the second direction Y.

The pixel PX includes a switching element SW and the pixel electrode 13. The switching element SW is a thin-film transistor, for example, and is electrically connected to the scanning line G and the signal line S. More specifically, the switching element SW includes a gate electrode GE, a source electrode SE and a drain electrode DE. The gate electrode GE is formed integrally with the scanning line G. The switching element SW is a bottom-gate type in which the gate electrode GE is located below a semiconductor layer SC in the example illustrated but may be a top-gate type in which the gate electrode GE is located above the semiconductor layer SC. The semiconductor layer SC is formed of amorphous silicon, for example, but may be formed of polycrystalline silicon, an oxide semiconductor, etc. The source electrode SE is formed integrally with the signal line S and contacts the semiconductor layer SC. The drain electrode DE is separated from the source electrode SE and contacts the semiconductor layer SC. The pixel electrode 13 overlaps the drain electrode DE from above and contacts the drain electrode DE in a contact hole CH.

Further, a capacitance line C is arranged between two scanning lines G. The pixel electrode 13 overlaps the capacitance line C from above. A portion in which the capacitance line C and the pixel electrode 13 overlap each other produces storage capacitance.

Figure 9:
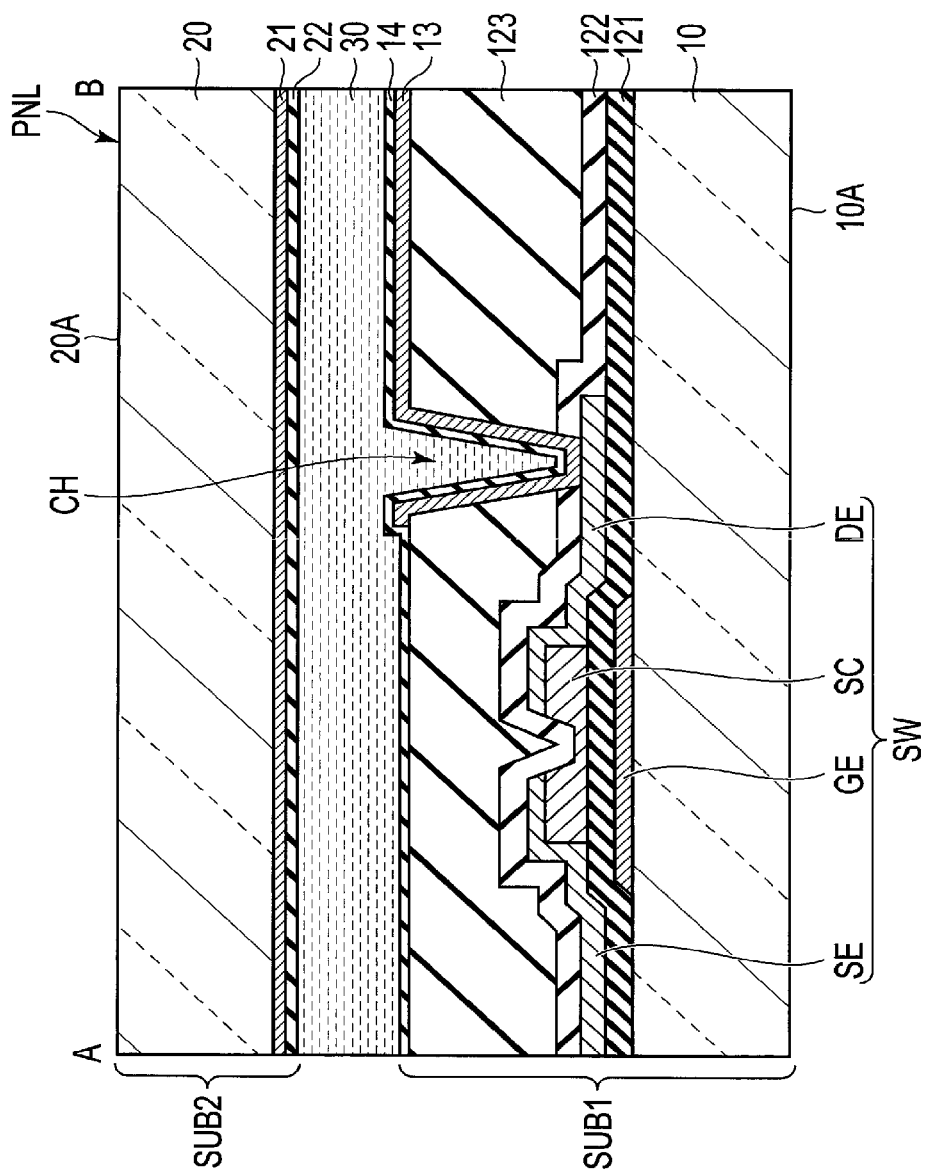
FIG. 9 is a sectional view of the pixel PX taken along line A-B shown in FIG. 8.

FIG. 9 is a sectional view of the pixel PX taken along line A-B shown in FIG. 8.

In the first substrate SUB1, the gate electrode GE and the scanning line G which is not shown in the drawing are located on the transparent substrate 10 and correspond to the wiring line 11 shown in FIG. 3, for example. An insulating layer 121 covers the gate electrode GE and the transparent substrate 10. The semiconductor layer SC is located on the insulating layer 121 directly above the gate electrode GE. The source electrode SE and the drain electrode DE are located on the insulating layer 121 and contacts the semiconductor layer SC. An insulating layer 122 covers the semiconductor layer SC, the source electrode SE, the drain electrode DE and the insulating layer 121. An insulating layer 123 covers the insulating layer 122. The insulating layers 121 to 123 correspond to the insulating layer 12 shown in FIG. 3, for example. The insulating layers 121 and 122 are formed of a transparent inorganic insulating material such as silicon nitride or silicon oxide. The insulating layer 123 is formed of a transparent organic insulating material such as acrylic resin. The pixel electrode 13 is located on the insulating layer 123. The pixel electrode 13 contacts the drain electrode DE in the contact hole CH which penetrates the insulating layers 122 and 123. An alignment film 14 covers the pixel electrode 13 and the insulating layer 123.

In the second substrate SUB2, the common electrode 21 is located below the transparent substrate 20. An alignment film 22 covers the common electrode 21. The liquid crystal layer 30 contacts the alignment films 14 and 22.

FIG. 10 is a plan view showing an example of the relationship between the opening OP of the optical layer 60 and the pixel electrode 13. In the example illustrated, a pixel electrode 13*a* and a pixel electrode 13*b* are arranged in the second direction Y. The pixel electrode 13*a* is closer to the light emitting element LS than the pixel electrode 13*b*.

Each of the pixel electrodes 13*a* and 13*b* overlaps the openings OP. In the example illustrated, openings OP*a* which overlap the pixel electrode 13*a* have the same shape and have substantially the same area. Further, openings OP*b* which overlap the pixel electrode 13*b* have the same shape and have substantially the same area.

In the present embodiment, a total of the areas (hereinafter referred to as the total area) of the openings OP*b* is larger than the total area of the openings OP*a*. In the example shown in FIG. 10, the number of the openings OP*b* and the number of the openings OP*a* are equal to each other, but the area of each opening OP*b* is larger than the area of each opening OP*a*. Therefore, the total area of the openings OP*b* is larger than the total area of the openings OP*a*. If the total area of the openings OP overlapping the pixel electrode 13 per unit area of pixel electrode 13 is defined as an aperture ratio, the aperture ratio of the openings OP*b* is higher than the aperture ratio of the openings OP*a*.

In the example illustrated, the openings OP are not periodically arranged. In other words, the distances between one opening OP and openings OP which are adjacent to the one opening OP are not the same. Some openings OP partially overlap the signal lines S, the scanning lines G and the pixel electrodes 13*a* and 13*b*. The openings OP have a circular shape in the example illustrated but may have any shape such as an elliptical shape, a polygonal shape or a shape consisting of a combination of a curve and a line.

Further, the number of the openings OPa and the number of the openings OPb are not limited to those of the example illustrated.

According to the present embodiment, the display device DSP includes the light guide element LG which includes the light guide layer 50 and the optical layer 60 having the openings OP. The refractive index of the optical layer 60 is lower than the refractive index of the light guide layer 50. Therefore, part of the light traveling through the light guide layer 50 is reflected at the border of the light guide layer 50 and the optical layer 60 and is substantively confined within the light guide layer 50, and therefore the light can be transmitted to an area which is far from the light emitting element LS. Further, as the opening OP is located farther from the light emitting element LS, the area of the opening OP becomes larger. According to this structure, the amount of light which enters the display panel PNL from the light guide element LG near the light emitting element LS can be reduced, and the amount of light which enters the display panel PNL from the light guide element LG in the area far from the light emitting element LS can be increased. Therefore, even if the intensity of light which travels on the side which is far from the light emitting element LS is lower than the intensity of light which travels on the side which is close to the light emitting element LS, the difference of luminance caused by the distance from the light emitting element LS can be reduced, and degradation of display quality can be prevented.

Further, the optical layer 60 is provided entirely across an area overlapping the extension portion EX, that is, an area between the edge E12 and the edge E22 in the second direction Y. Therefore, the light emitted from the light emitting element LS can be prevented from leaking through the extension portion Ex, and the light can be used more efficiently.

FIG. 11 is a sectional view showing a method of forming the light guide element LG. As shown in FIG. 11 (*a*), a transparent layer 600 formed of a transparent material is formed on the first surface 50A of the light guide layer 50. The refractive index of the transparent layer 600 is lower than the refractive index of the light guide layer 50. Subsequently, a resist layer R1 is formed on the transparent layer 600. A photomask PM is disposed on the resist layer R1 as shown in FIG. 11 (*b*). The photomask PM has a shielding portion PMA which blocks ultraviolet light and has a transmitting portion PMB which transmits ultraviolet light. Subsequently, ultraviolet light is applied to the light guide layer 50 through the photomask PM. An area of the resist layer R1 which overlaps the shielding layer PMA is removed by lithography treatment as shown in FIG. 11 (*c*). Subsequently, etching processing is performed by using the resist layer R1 as a mask, and the optical layer 60 having the openings OP is formed, and the light guide element LG is formed. An adhesive layer 70 is formed entirely on the first surface 50A side as shown in FIG. 11 (*d*). The adhesive layer 70 contacts the optical layer 60 and also contacts the first surface 50A in the openings OP. Subsequently, the light guide element LG is attached to the display panel PNL via the adhesive layer 70.

Note that the method of forming the light guide element LG is not limited to the above-described example. For example, the optical layer 60 having the openings OP may be formed on the first surface 50A by printing. Alternatively, after the openings OP are formed in the optical layer 60 by die cutting, etc., the optical layer 60 may be arranged on the first surface 50A.

FIG. 12 is a plan view showing another example of the optical layer 60. The example shown in FIG. 12 differs from the example shown in FIG. 10 in that the number of the openings OP per unit area varies in the second direction Y. That is, in the example shown in FIG. 12, the area of each opening OPa and the area of each opening OPb are equal to each other, but the number of the openings OPb is greater than the number of the openings OPa. Therefore, the total area of the openings OPb is larger than the total area of the openings OPa. The same effect as that produced from the example shown in FIG. 10 can also be produced from the present example.

Figure 13:
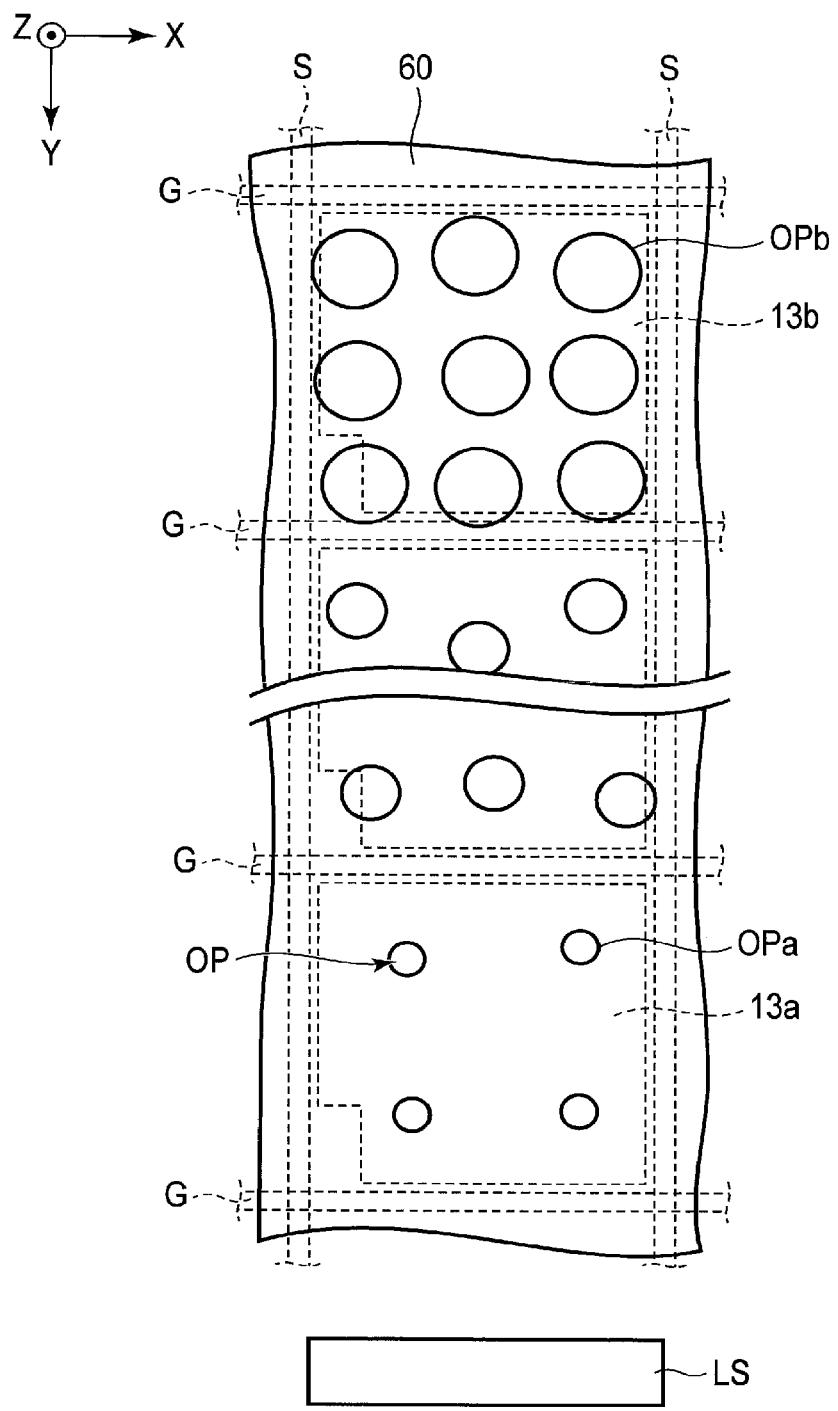
FIG. 13 is a plan view showing another example of the optical layer 60.

FIG. 13 is a plan view showing another example of the optical layer 60. The example shown in FIG. 13 differs from the example shown in FIG. 10 in that both the area of the opening OP and the number of the openings OP per unit area vary in the second direction Y. In the example shown in FIG. 13, the area of each opening OPb is larger than the area of each opening OPa. Further, the number of the openings OPb is greater than the number of the openings OPa. Therefore, the total area of the openings OPb is larger than the total area of the openings OPa. Even if the area of each opening OPb is smaller than the area of each opening OPa, the total area of the openings OPb may become larger than the total area of the openings OPa by increasing the number of the openings OPb substantially. Further, even if the number of the openings OPb is less than the number of the openings OPa, the total area of the openings OPb may become larger than the total area of the openings OPa by making the area of the opening OPb substantially larger than the area of the opening OPa. The same effect as that produced from the example shown in FIG. 10 can also be produced from the present example.

FIG. 14 is a plan view showing another example of the optical layer 60. The example shown in FIG. 14 differs from the example shown in FIG. 10 in that the openings OP having different areas overlap the single pixel electrode 13. In the example shown in FIG. 14, among the openings OP overlapping the pixel electrode 13*a*, the area of an opening OPa2 located on the side far from the light emitting element LS is larger than the area of an opening OPa1 located on the light emitting element LS side. Similarly, among the openings OP overlapping the pixel electrode 13*b*, the area of an opening OPb2 located on the side far from the light emitting element LS is larger than the area of an opening OPb1 located on the light emitting element LS side. The same effect as that produced from the example shown in FIG. 10 can also be produced from the present example.

Figure 15:
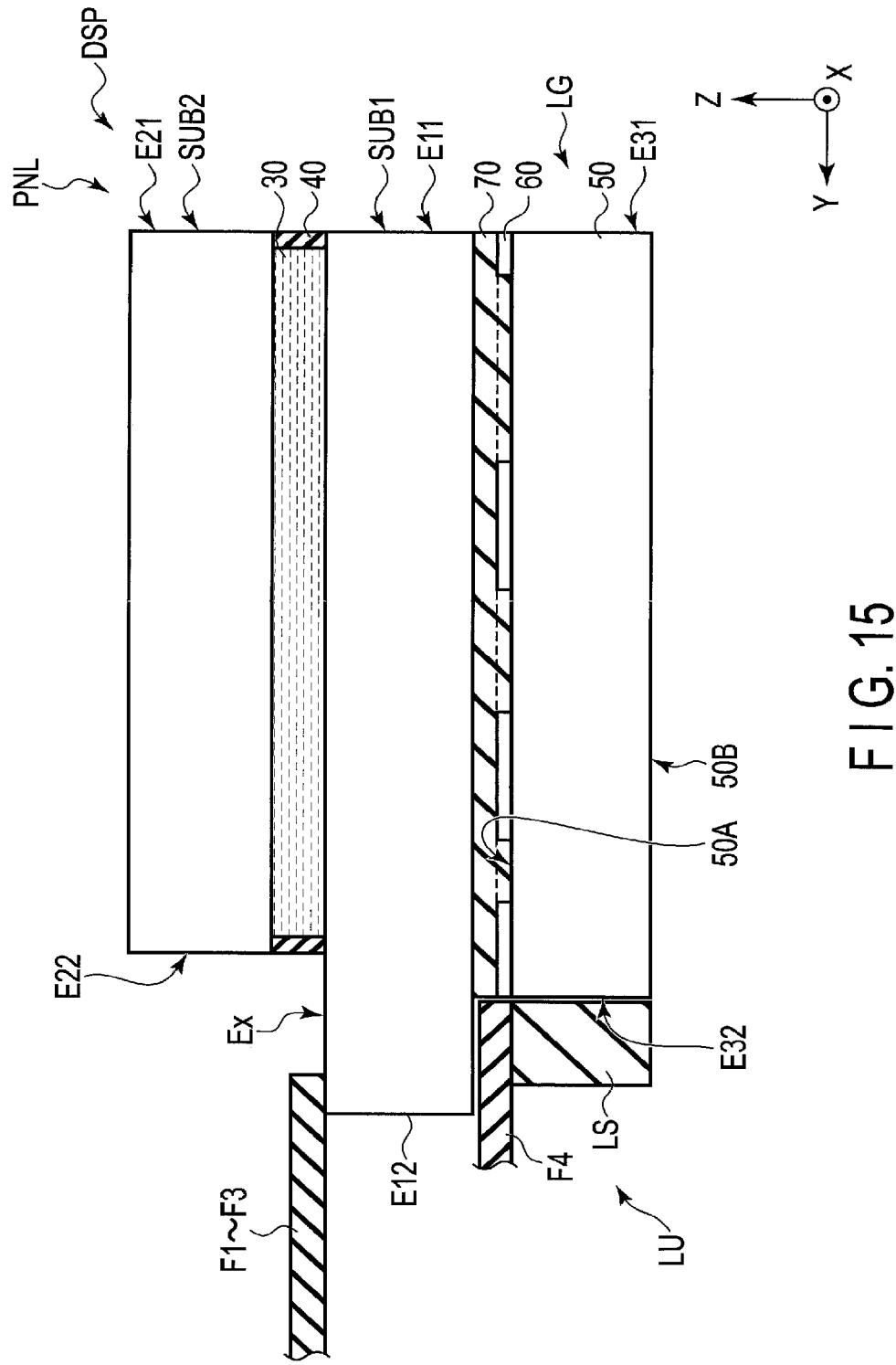
FIG. 15 is a sectional view showing another example of the display device DSP.

FIG. 15 is a sectional view showing another example of the display device DSP. The example shown in FIG. 15 differs from the example shown in FIG. 2 in that the light emitting element LS is located directly below the extension portion Ex. In the example illustrated, the edge E32 of the light guide layer 50 is located between the edge E12 of the first substrate SUB1 and the edge E22 of the second substrate SUB2 in the second direction Y. The light emitting element LS entirely overlaps the first substrate SUB1. The same effect as that produced from the example shown in FIG. 2 can also be produced from the present example. Further, since the light emitting element LS overlaps the extension portion Ex, the width of the non-display area NDA which does not contribute to display can be reduced, and consequently, the frame can be narrowed.

FIG. 16 is a sectional view showing another example of the display device DSP. The example shown in FIG. 16 differs from the example shown in FIG. 15 in that the light guide element LG is located on the second substrate SUB2 side. That is, the first surface 50A is opposed to the second substrate SUB2. The adhesive layer 70 contacts the light guide layer 50, the optical layer 60 and the second substrate SUB2. The light emitting element LS is located directly above the extension portion Ex and entirely overlaps the first substrate SUB1. In the example illustrated, the edge E32 overlaps the edge E22. The same effect as that produced from the example shown in FIG. 15 can also be produced from the present example.

Figure 17:
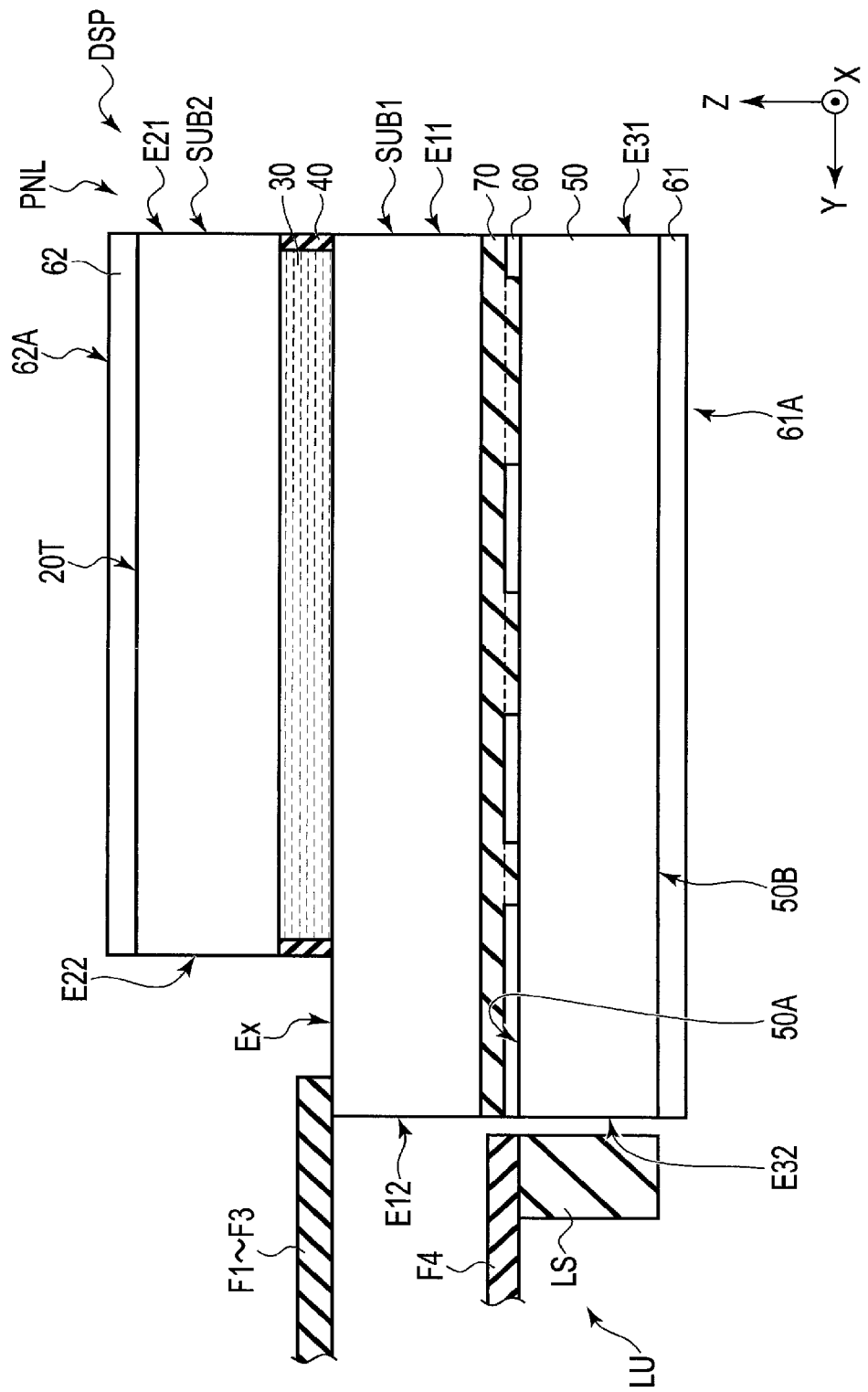
FIG. 17 is a sectional view showing another example of the display device DSP.

FIG. 17 is a sectional view showing another example of the display device DSP. The example shown in FIG. 17 differs from the example shown in FIG. 2 in that the display device DSP further includes optical layers 61 and 62. The refractive index of the optical layer 61 and the refractive index of the optical layer 62 are lower than the refractive index of the light guide layer 50. For example, the optical layers 61 and 62 are formed of the same material as that of the optical layer 60. In other words, the refractive index of the optical layer 61 and the refractive index of the optical layer 62 are equal to the refractive index of the optical layer 60.

The optical layer 61 contacts the entire second surface 50B. That is, the optical layer 61 is provided in an area between the edge E31 and the edge E32 in the second direction Y. The optical layer 62 contacts the entire upper surface 20T. That is, the optical layer 62 is provided in an area between the edge E21 and the edge E22 in the second direction Y. The optical layers 61 and 62 do not have openings. The light traveling through the display panel PNL and the light guide element LG is also reflected at the border of the light guide layer 50 and the optical layer 61 (that is, by the second surface 50B) and the border of the second substrate SUB2 and the optical layer 62 (that is, by the upper surface 20T) in addition to the border of the light guide layer 50 and the optical layer 60 and the border of the adhesive layer 70 and the optical layer 60.

The same effect as that produced from the example shown in FIG. 2 can also be produced from the present example. Further, according to the present example, even if foreign materials such as drops of water are on a surface 61A of the optical layer 61 and a surface 62A of the optical layer 62, the light traveling through the display panel PNL and the light guide element LG are reflected off the second surface 50B and the upper surface 20T with reflection conditions thereof unchanged. That is, it is possible to prevent scattering of light caused by foreign matters on the surfaces of the display device DSP and prevent decrease of the efficiency of usage of light.

Figure 18:
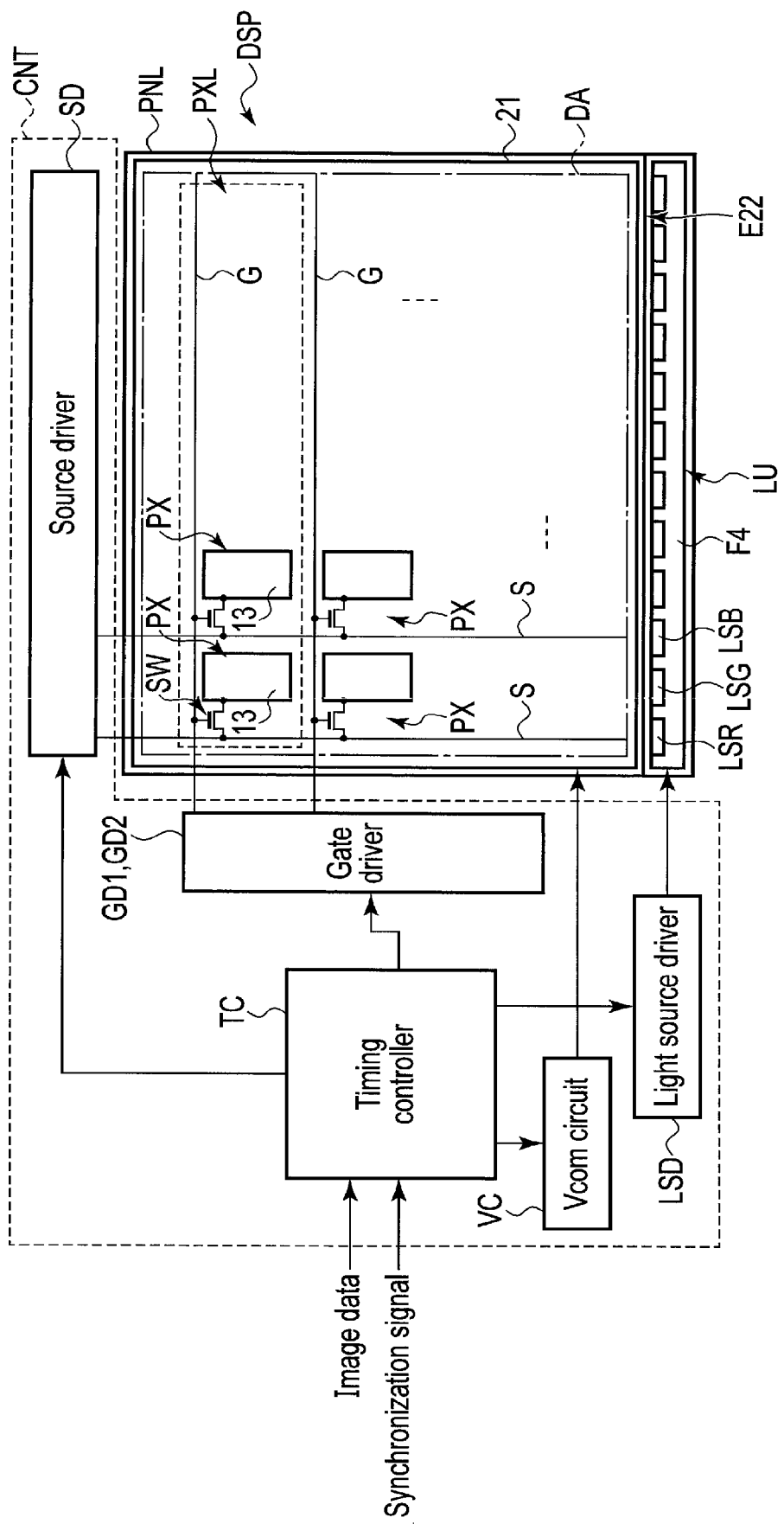
FIG. 18 is a diagram showing the main structural elements of the display device DSP shown in FIG. 1.

FIG. 18 is a diagram showing the main structural elements of the display device DSP shown in FIG. 1. The display device DSP includes a controller CNT shown by a dotted line in the drawing. The controller CNT includes a timing controller TC, the gate drivers GD1 and GD2, the source driver SD, a Vcom circuit VC, a light source driver LSD, etc. The timing controller TC generates various signals based on image data, a synchronization signal, etc., which are input from the outside. For example, the timing controller TC outputs a video signal generated from predetermined signal processing of the image data to the source driver SD. Further, the timing controller TC outputs control signals generated based on the synchronization signal to the gate drivers GD1 and GD2, the source driver SD, the Vcom circuit VC and the light source driver LSD, respectively.

A scanning signal is supplied to each scanning line G from the gate driver GD1 or GD2. A video signal is supplied to each signal line S from the source driver SD. A common voltage is applied to the common electrode 21 from the Vcom circuit VC. The video signal supplied to the signal line S is supplied to the pixel electrode 13 connected to the switching element SW during a period in which the switching element SW is conductive based on the scanning signal supplied to the scanning line G. A high-level voltage is applied to the scanning line G as the scanning signal during a period in which the switching element SW is conductive, and a low-level voltage is applied to the scanning line G as the scanning signal during a period in which the switching element SW is nonconductive. For example, the high-level voltage is +20 V and the low-level voltage is −20 V. If the common electrode 21 is set to a voltage of 0 V as the common voltage, a potential difference of 20 V is produced not only between the common electrode 21 and the scanning line G which is subjected to the high-level voltage but also between the common electrode 21 and the scanning line G which is subjected to the low-level voltage. In the present embodiment, leakage of light caused by undesired scattering of light of the liquid crystal layer 30 can be prevented between the scanning line G and the common electrode 21 by applying the above-described first to third structural examples.

The light source unit LU includes, for example, a light emitting element (first light emitting element) LSR which emits light having the first color, a light emitting element (second light emitting element) LSG which emits light having the second color, and a light emitting element (third light emitting element) LSB which emits light having the third color. For example, the first color is red, the second color is green and the third color is blue. The dominant emission wavelength of the light emitting element LSR is 622 nm, for example. The dominant emission wavelength of the light emitting element LSR is 531 nm, for example. The dominant emission wavelength of the light emitting element LSB is 466 nm, for example. The light emitting elements LSR, LSG and LSB are arranged in the extension direction of the scanning lines G (the first direction X). Further, the light emitting elements LSR, LSG and SLB are opposed to the edge E22.

The light source driver SD controls the lighting periods of the light emitting elements LSR, LSG and LSB according to the control signals from the timing controller TC, etc. In a driving mode in which one frame has a plurality of sub-frames (fields), at least one of the three light emitting elements LSR, LSG and LSB is lighted, and the color of illumination light is switched sub-frame by sub-frame.

As described above, according to the present embodiment, a display device which can prevent degradation of display quality can be provided.

In the present embodiment, the light guide layer 50 corresponds to the light guide layer. The first surface 50A corresponds to the first surface, the second surface 50B corresponds to the second surface, and the edge E32 corresponds to the edge or the first edge. The edge E12 of the first substrate SUB1 corresponds to the second edge. The edge E22 of the second substrate SUB2 corresponds to the third edge. The optical layer 60 corresponds to the first optical layer. The pixel electrode 13a corresponds to the first pixel electrode, and the pixel electrode 13b corresponds to the second pixel electrode. The opening OPa corresponds to the first opening, and the opening OPb corresponds to the second opening. The opening OPa1 corresponds to the third opening, the opening OPa2 corresponds to the fourth opening, the opening OPb1 corresponds to the fifth opening, and the opening OPb2 corresponds to the sixth opening. The upper surface 20T corresponds to the third surface. The optical layer 61 corresponds to the second optical layer, and the optical layer 62 corresponds to the third optical layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display panel including a first substrate, a second substrate which is opposed to the first substrate, polymers and liquid crystal molecules which are between the first substrate and the second substrate;
    a light emitting element;
    a light guide layer having a first surface which is opposed to the display panel, and a first side which is at a side of the light emitting element and a second side which is at the other side of the light emitting element;
    a first optical layer located between the first surface and the light guide layer and extending from the first side to the second side; and
    an adhesive layer located between the display panel and the light guide layer,
    wherein
    a refractive index of the first optical layer is lower than a refractive index of the light guide layer,
    the first substrate is located between the second substrate and the light guide layer,
    the adhesive layer contacts the first substrate and the light guide layer,
    the adhesive layer is located between the first substrate and the first optical layer,
    a refractive index of the adhesive layer is higher than the refractive index of the first optical layer, and is equal to a refractive index of the first substrate and the refractive index of the light guide layer, and
    an area of the first optical layer decreases as a distance from the light emitting element increases.

2. The display device according to claim 1, wherein the first optical layer includes a plurality of openings whose refractive index is equal to the refractive index of the light guide layer.

3. The display device according to claim 2, wherein the number of openings increases from the first side to the second side.

4. The display device according to claim 2, wherein the first optical layer includes a first opening at the first side and a second opening at the second side, and an area of the second opening is larger than an area of the first opening.

5. A display device comprising:
    a display panel including a first substrate, a second substrate which is opposed to the first substrate, polymers and liquid crystal molecules which are between the first substrate and the second substrate;
    a light emitting element;
    a light guide layer having a first surface which is opposed to the display panel, and a first side which is at a side of the light emitting element and a second side which is at the other side of the light emitting element;
    a first optical layer located between the first surface and the light guide layer and extending from the first side to the second side; and
    an adhesive layer located between the display panel and the light guide layer,
    wherein
    a refractive index of the first optical layer is lower than a refractive index of the light guide layer,
    the first substrate is located between the second substrate and the light guide layer,
    the adhesive layer contacts the first substrate and the light guide layer,
    the adhesive layer is located between the first substrate and the first optical layer,
    a refractive index of the adhesive layer is higher than the refractive index of the first optical layer, and is equal to a refractive index of the first substrate and the refractive index of the light guide layer,
    the first optical layer includes a first side opening part and a second side opening part, and
    the first side opening part is smaller than the second side opening part.

6. The display device according to claim 5, wherein the first side opening part and the second side opening part have a refractive index equal to the refractive index of the light guide layer.

* * * * *